(12) United States Patent
Sugita

(10) Patent No.: US 7,340,655 B2
(45) Date of Patent: Mar. 4, 2008

(54) SKEW ADJUSTMENT CIRCUIT, SKEW ADJUSTMENT METHOD, DATA SYNCHRONIZATION CIRCUIT, AND DATA SYNCHRONIZATION METHOD

(75) Inventor: Natsuki Sugita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 549 days.

(21) Appl. No.: 10/164,374

(22) Filed: Jun. 10, 2002

(65) Prior Publication Data

US 2003/0091136 A1 May 15, 2003

(30) Foreign Application Priority Data

Nov. 15, 2001 (JP) ............................. 2001-350453
Mar. 7, 2002 (JP) ............................. 2002-062313

(51) Int. Cl.
*G06K 5/04* (2006.01)
(52) U.S. Cl. ................. 714/700; 714/703; 714/715
(58) Field of Classification Search ............... 714/700, 714/54, 48, 703, 715, 719, 731, 744; 713/503
See application file for complete search history.

(56) References Cited

U.S. PATENT DOCUMENTS

| | | | | | |
|---|---|---|---|---|---|
| 5,905,769 | A * | 5/1999 | Lee et al. | ..................... | 375/376 |
| 6,374,361 | B1 * | 4/2002 | Lee et al. | ..................... | 713/503 |
| 6,498,824 | B1 * | 12/2002 | Johnson | ....................... | 375/373 |
| 6,510,503 | B2 * | 1/2003 | Gillingham et al. | ........ | 711/167 |
| 6,735,710 | B1 * | 5/2004 | Yoshikawa | .................. | 713/500 |
| 6,907,552 | B2 * | 6/2005 | Collins | ....................... | 714/700 |
| 2002/0027964 | A1 | 3/2002 | Yoo et al. | | |

FOREIGN PATENT DOCUMENTS

| | | |
|---|---|---|
| EP | 0 520 127 A1 | 12/1992 |
| JP | A 62-159544 | 7/1987 |
| JP | A 10-327136 | 12/1998 |
| JP | 11-511926 | 10/1999 |
| JP | A 2000-174736 | 6/2000 |
| JP | A 2002-124938 | 4/2002 |

OTHER PUBLICATIONS

Lee, K et al., "A CMOS Serial Link for Fully Duplexed Data Communication", IEICE Transactions on Electronics. Institute of Electronics Information and Comm. Eng. Tokyo, Japan.

* cited by examiner

*Primary Examiner*—Jacques Louis-Jacques
*Assistant Examiner*—Fritz Alphonse
(74) *Attorney, Agent, or Firm*—Oliff & Berridge, PLC

(57) ABSTRACT

A skew adjustment circuit employs a novel algorithm enabling a reduction in scale of the circuit of a receiver for a Transition Minimized Differential Signaling (T.M.D.S.) link in accordance with the Digital Visual Interface (DVI) standard. The skew adjustment circuit includes a sampling point selection section that performs comparison processing on oversampled data, assumes transition points of serial data, and outputs a sampling point selection signal; and a data recovery section that outputs oversampled data at the sampling point selected by the selection signal, as sample data for the serial data. Comparison processing is performed on the oversampled data in 4-bit segment units of the serial data, transition point detection signals are held, and the transition points of the serial data are assumed based on those transition point detection signals, when transition point detection signals for at least two segments, which are among the held transition point detection signals, indicate the same result. The comparison processing is performed on pairs of every other point of oversampled data.

4 Claims, 29 Drawing Sheets

SKEW ADJUSTMENT

FIG. 7

| Gαβ (DET αβ) | Gβγ (DET βγ) | Gγα (DET γα) | INTERVAL WITH TRANSITION POINT | SAMPLING PHASE TO BE SELECTED |
|---|---|---|---|---|
| X(0) | X(0) | 1 | γ OR α | B OR C |
| 1 | 0 | 1 | α | C |
| 1 | X(0) | X(0) | α OR β | C OR A |
| X(0) | 1 | 0 | β | A |
| X(0) | 1 | X(0) | β OR γ | A OR B |
| 0 | 1 | 1 | γ | B |

WHEN ALL OF I0, I1, I2, AND I3 ARE 1: Q = 1
ALL OTHER CASES: Q = 0

DETECTION SIGNAL GENERATION (AND METHOD)

WHEN AT LEAST THREE OF I0, I1, I2, AND I3 ARE 1: Q = 1
ALL OTHER CASES: Q = 0

DETECTION SIGNAL GENERATION (AT-LEAST-THREE METHOD)

FIG. 11A

AND METHOD (NEXT-BUT-ONE EXOR TYPE)

| CASE | ACTUAL TRANSITION POINT LOCATIONS AND NUMBERS | | | | | INTERVAL IN WHICH TRANSITION POINTS ARE ASSUMED TO EXIST | SAMPLING PHASE TO BE SELECTED |
|---|---|---|---|---|---|---|---|
| | $\beta$ | $\gamma$ | $\alpha$ | $\beta$ | $\gamma$ | | |
| 1 | 0 | 0 | 4 | 0 | 0 | $\alpha$ | C |
| 2 | 0 | 1 | 3 | 0 | 0 | $\gamma$ OR $\alpha$ | B OR C |
| 3 | 0 | 2 | 2 | 0 | 0 | $\gamma$ OR $\alpha$ | B OR C |
| 4 | 0 | 1 | 2 | 1 | 0 | NONE | NONE |

FIG. 11B

AT-LEAST-THREE METHOD (NEXT-BUT-ONE EXOR TYPE)

| CASE | ACTUAL TRANSITION POINT LOCATIONS AND NUMBERS | | | | | INTERVAL IN WHICH TRANSITION POINTS ARE ASSUMED TO EXIST | SAMPLING PHASE TO BE SELECTED |
|---|---|---|---|---|---|---|---|
| | $\beta$ | $\gamma$ | $\alpha$ | $\beta$ | $\gamma$ | | |
| 5 | 0 | 0 | 4 | 0 | 0 | $\alpha$ | C |
| 6 | 0 | 1 | 3 | 0 | 0 | $\alpha$ | C |
| 7 | 0 | 2 | 2 | 0 | 0 | $\gamma$ OR $\alpha$ | B OR C |
| 8 | 0 | 1 | 2 | 1 | 0 | $\alpha$ | C |

WHEN AT LEAST TWO OF I0, I1, I2, I3, AND I4 ARE 1: Q = 1
ALL OTHER CASES: Q = 0

2-OF-5 DETECTION

FILTER

PHASE SELECTION SIGNAL GENERATION

| TRANSITION POINT | | | PHASE | | |
|---|---|---|---|---|---|
| I2 (AS α β') | I1 (AS β γ') | I0 (AS γ α') | Q2 (SELA) | Q1 (SELB) | Q0 (SELC) |
| 0 | 0 | 0 | 0 | 0 | 0 |
| 0 | 0 | 1 | 0 | 1 | 1 |
| 0 | 1 | 0 | 1 | 1 | 0 |
| 0 | 1 | 1 | 0 | 1 | 0 |
| 1 | 0 | 0 | 1 | 0 | 1 |
| 1 | 0 | 1 | 0 | 0 | 1 |
| 1 | 1 | 0 | 1 | 0 | 0 |
| 1 | 1 | 1 | 0 | 0 | 0 |

DATA RECOVERY

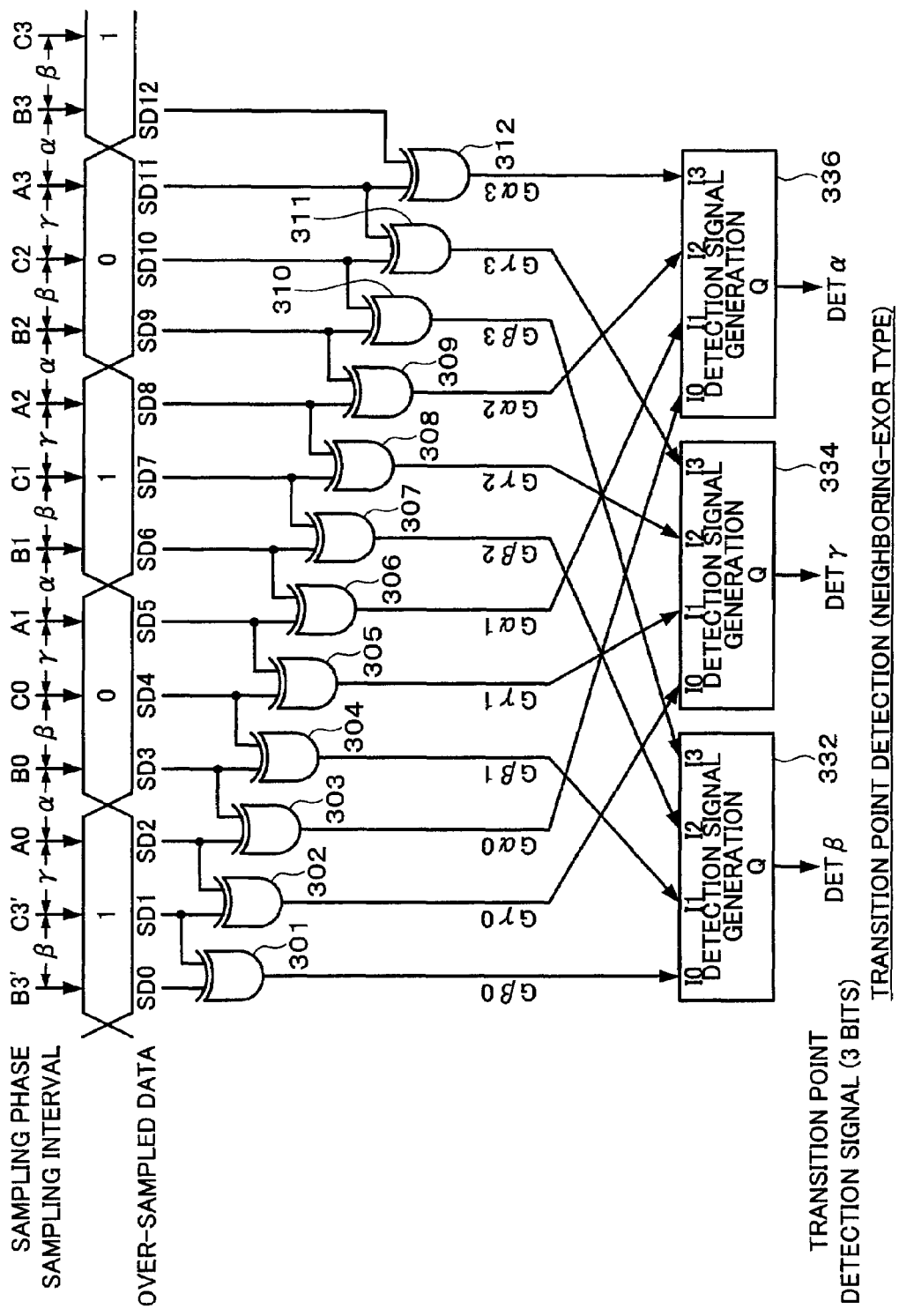

FIG. 22A

AND METHOD (NEIGHBORING-EXOR TYPE)

| CASE | ACTUAL TRANSITION POINT LOCATIONS AND NUMBERS | | | | | INTERVAL IN WHICH TRANSITION POINTS ARE ASSUMED TO EXIST | SAMPLING PHASE TO BE SELECTED |
|---|---|---|---|---|---|---|---|
| | $\beta$ | $\gamma$ | $\alpha$ | $\beta$ | $\gamma$ | | |
| 1 | | 0 | ④ | 0 | | $\alpha$ | C |
| 2 | | 1 | 3 | 0 | | NONE | NONE |
| 3 | | 2 | 2 | 0 | | NONE | NONE |
| 4 | | 1 | 2 | 1 | | NONE | NONE |

FIG. 22B

AT-LEAST-THREE METHOD (NEIGHBORING-EXOR TYPE)

| CASE | ACTUAL TRANSITION POINT LOCATIONS AND NUMBERS | | | | | INTERVAL IN WHICH TRANSITION POINTS ARE ASSUMED TO EXIST | SAMPLING PHASE TO BE SELECTED |
|---|---|---|---|---|---|---|---|
| | $\beta$ | $\gamma$ | $\alpha$ | $\beta$ | $\gamma$ | | |
| 1 | | 0 | ④ | 0 | | $\alpha$ | C |
| 2 | | 1 | ③ | 0 | | $\alpha$ | C |
| 3 | | 2 | 2 | 0 | | NONE | NONE |
| 4 | | 1 | 2 | 1 | | NONE | NONE |

PRIOR ART

DETECTION

FIG. 27

| CASE | DE0(t₀),DE1(t₀),DE2(t₀) | | | DE0(t₁),DE1(t₁),DE2(t₁) | | | S0 | S1 | S2 |
|---|---|---|---|---|---|---|---|---|---|
| A | 0 | 0 | 0 | 1 | 1 | 1 | 0 | 0 | 0 |
| B | 1 | 0 | 0 | 1 | 1 | 1 | 1 | 0 | 0 |
| C | 0 | 1 | 0 | 1 | 1 | 1 | 0 | 1 | 0 |
| D | 0 | 0 | 1 | 1 | 1 | 1 | 0 | 0 | 1 |
| E | 0 | 1 | 1 | 1 | 1 | 1 | 0 | 1 | 1 |
| F | 1 | 0 | 1 | 1 | 1 | 1 | 1 | 0 | 1 |
| G | 1 | 1 | 0 | 1 | 1 | 1 | 1 | 1 | 0 |

(FIRST TIMING)  (SECOND TIMING)

SKEW ADJUSTMENT CIRCUIT, SKEW ADJUSTMENT METHOD, DATA SYNCHRONIZATION CIRCUIT, AND DATA SYNCHRONIZATION METHOD

Japanese patent application numbers. 2001-350453, filed on Nov. 15, 2001, and 2002-62313 filed on Mar. 7, 2002, are hereby incorporated by reference in their entirety.

BACKGROUND OF THE INVENTION

The present invention relates to a skew adjustment circuit, a skew adjustment method, a data synchronization circuit, and a data synchronization method.

A standard called the digital visual interface (DVI) has recently attracted attention as a standard for display interfaces. This DVI standard makes it possible to transfer image information between a host computer and a display device, not only over short distances but also over longer distances of 5 meters or more.

The DVI standard employs a protocol that is called a transition minimized differential signaling (T.M.D.S.) link, using three red, green, and blue (RGB) difference data channel and one difference clock channel. With such a T.M.D.S. link, it is necessary to provide the receiver with a function that detects and removes any skew between the data and the clock that may occur as a result of the long-distance transfer, to extract correct data. It is also necessary to provide the receiver with a function for detecting character boundaries in the received data, and a function for detecting skew between the data channels and aligning the phases of data between the channels.

The DVI standard enables a rough estimation of the algorithms and circuit configuration required for implementing these functions, but details of these algorithms and circuit configuration cannot be determined uniquely and a number of variations thereof can be considered. An example of a circuit that implements these functions was disclosed in Japanese Patent Publication No. 11-511926 (U.S. Pat. No. 5,905,769).

BRIEF SUMMARY OF THE INVENTION

One aspect of the present invention relates to a skew adjustment circuit comprising:

a sampling point selection section which receives oversampled data obtained by oversampling serial data, performs comparison processing on the oversampled data, assumes a transition point of the serial data based on a result of the comparison, and outputs a selection signal for selecting a sampling point of the serial data from among oversampling points; and a data recovery section which receives the oversampled data and the selection signal, and outputs oversampled data at a sampling point selected by the selection signal, as sample data of the serial data, the sampling point selection section performing comparison processing on the oversampled data in every J-bit segment of serial data; holding first to Nth transition point detection signals obtained by performing comparison processing on first to Nth J-bit segments, respectively; and assuming a transition point of serial data based on transition point detection signals that indicate a same result when transition point detection signals for at least two segments, among the held first to Nth transition point detection signals, indicate a same result.

Another aspect of the present invention relates to a skew adjustment circuit comprising;

a sampling point selection section which receives oversampled data obtained by oversampling serial data, performs comparison processing on the oversampled data, assumes a transition point of the serial data based on a result of the comparison, and outputs a selection signal for selecting a sampling point of serial data from among oversampling points; and a data recovery section which receives the oversampled data and the selection signal, and outputs oversampled data at a sampling point selected by the selection signal, as sample data of the serial data, skew adjustment being performed on a condition that at least two all-bits transition patterns of J-bit segments are detected within the serial data of a predetermined number of bits that is transferred in a blanking period.

A further aspect of the present invention relates to a skew adjustment circuit comprising:

a sampling point selection section which receives oversampled data obtained by oversampling serial data, performs comparison processing on the oversampled data, assumes a transition point of the serial data based on a result of the comparison, and outputs a selection signal for selecting a sampling point of serial data from among oversampling points; and a data recovery section which receives the oversampled data and the selection signal, and outputs oversampled data at a sampling point selected by the selection signal, as sample data of the serial data;

the sampling point selection section performing comparison processing on a predetermined number of groups of oversampled data, each of the groups including next-but-one oversampled data, and assuming a transition point of serial data based on a result of the comparison processing.

A still further aspect of the present invention relates to a data synchronization circuit which detects a character boundary in data, and extracts and outputs a bit string delimited at a character boundary, the data synchronization circuit comprising:

a bit string output section which holds parallel data obtained from serial data, and outputs I-bit first to Mth bit strings extracted from the held parallel data while an extracted bit string is shifted by 1 bit at a time;

first to Mth detection sections which detects whether the first to Mth data strings match a synchronization character transferred in a blanking period, once or a plurality of times continuously, and outputs first to Mth detection signals that go active in correspondence with bit strings that have been matched, among the first to Mth bit strings;

a selection signal storage section which stores the first to Mth detection signals as first to Mth selection signals when one of the first to Mth detection signals is active, and holds the stored first to Mth selection signals when all of the first to Mth detection signals are inactive; and a bit string selection section which receives the first to Mth bit strings and the first to Mth selection signals, and selects and outputs a bit string in which a corresponding selection signal is active, from among the first to Mth bit strings.

Yet another aspect of the present invention relates to a data synchronization circuit which obtains synchronization between first to Lth channels through which first to Lth serial data is transferred, the data synchronization circuit comprising:

a holding section which holds first to Lth data enable signals that go active in a pixel data transfer period and go inactive in a blanking period during which a synchronization character is transferred;

a selection signal generation section which outputs first to Lth data enable signals that were held at a first timing as first to Lth selection signals, when any one of the first to Lth data enable signals held at the first timing are inactive and all of the first to Lth data enable signals held at a second timing continuing from the first timing are active; and a data delay section which delays data in a channel in which the first to Lth selection signals have become active, among data in the first to Lth channels.

BRIEF DESCRIPTION OF THE SEVERAL VIEWS OF THE DRAWING

FIG. 7 shows the relationship between the transition point detection signal, intervals in which serial data transition points are present, and the sampling phase to be selected;

FIG. 8 shows ten rows of 20 bits configured by a synchronization character;

FIG. 9 shows another ten rows of 20 bits configured by a synchronization character:

FIGS. 11A and 11B are illustrative of the method of assuming transition points when the next-but-one EXOR type of transition point detection section is employed;

FIG. 21 shows an example of the configuration of the neighboring-EXOR type of transition point detection section;

FIGS. 22A and 22B are illustrative of the method of assuming transition points when the neighboring-EXOR type of transition point detection section is employed;

FIG. 27 is illustrative of the pattern matching performed in the inter-channel synchronizer of this embodiment;

DETAILED DESCRIPTION OF THE EMBODIMENT

This embodiment of the present invention is described below.

Note that the embodiments described hereunder do not in any way limit the scope of the invention defined by the claims laid out herein. Note also that all of the elements of these embodiments should not be taken as essential requirements to the means of the present invention.

1. T.M.D.S. Link

Figure 1:
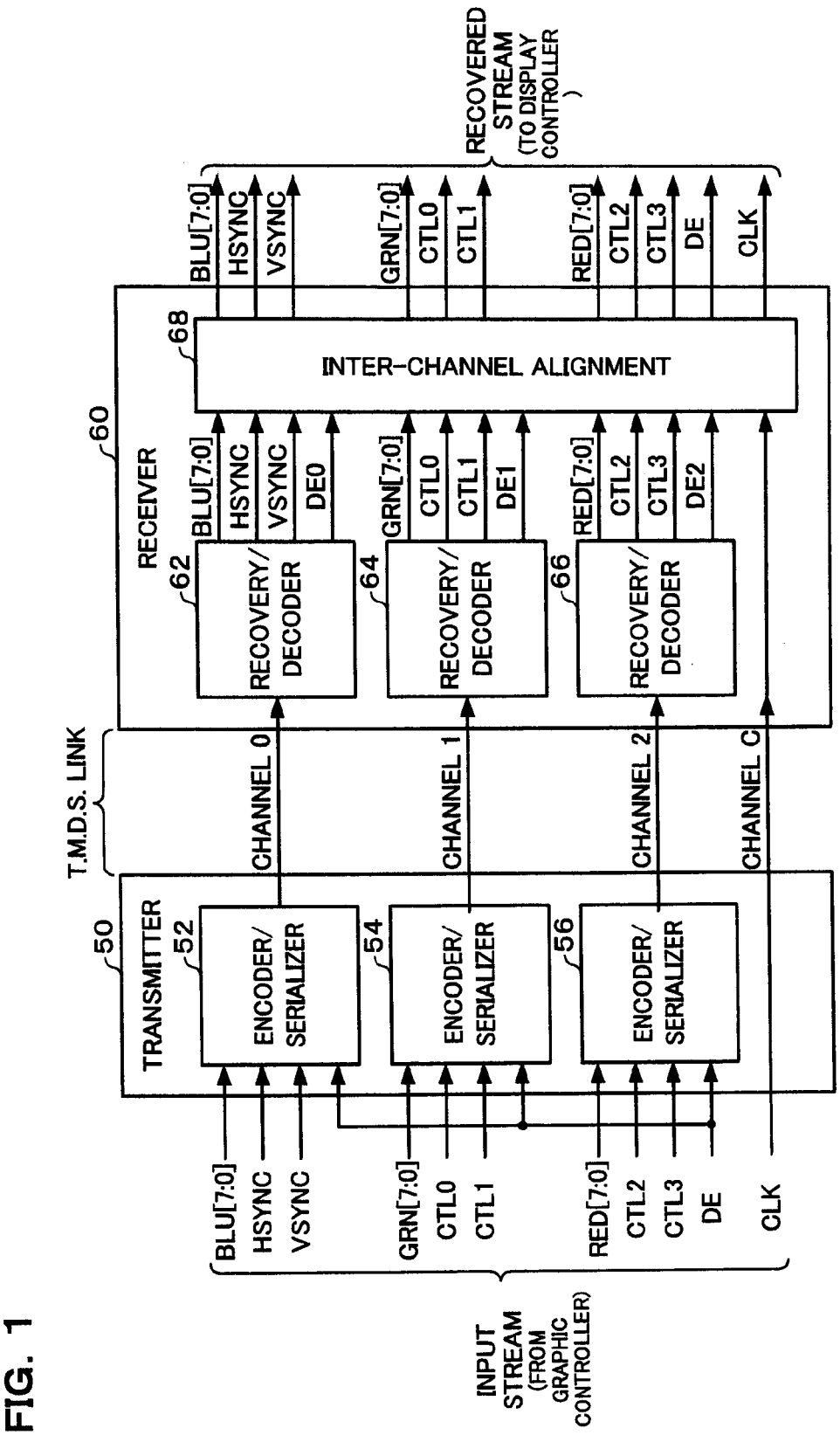
FIG. 1 is illustrative of a transmitter and receiver in a T.M.D.S. link in accordance with the DVI standard.
Figure 2:
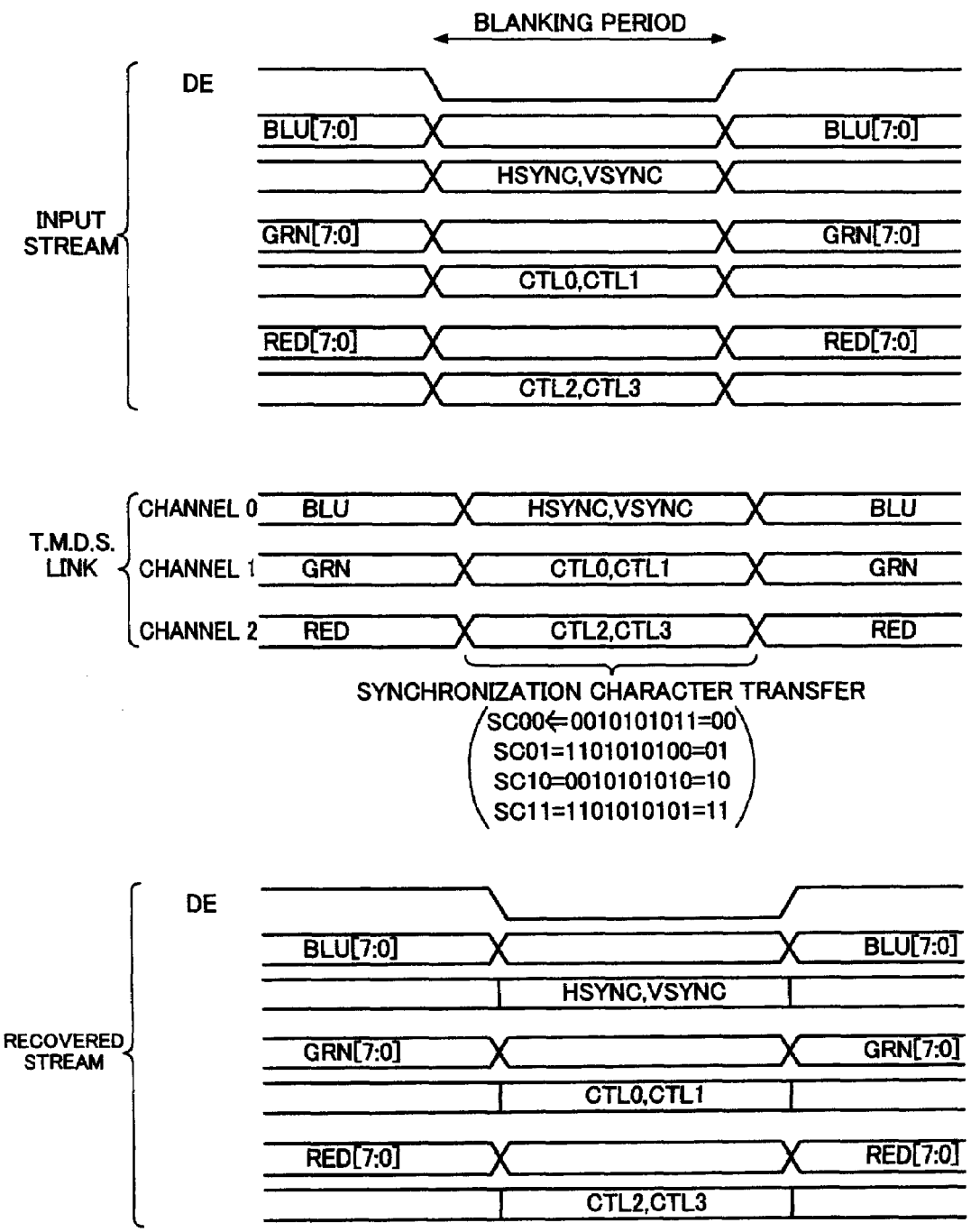
FIG. 2 is illustrative of signal transfer in the T.M.D.S. link in accordance with the DVI standard.

The description first concerns a T.M.D.S. link in accordance with the DVI standard, using FIGS. 1 and 2.

As shown in FIG. 1, a T.M.D.S. transmitter 50 is supplied with pixel data (BLU[7:0], GRN[7:0], RED[7:0]), control signals (HSYNC, VSYNC, CTL0 CTL1, CTL2. CTL3, and DE), and a reference clock signal CLK from a previous-stage graphics controller. In this case, pixel data is supplied during a data transfer period that occurs when the data enable signal DE is active (high). Control signals are supplied during a blanking period in which DE is inactive (low).

Encoder/serializers 52, 54, and 56 comprised by the transmitter 50 receive an input stream from the graphics controller, encode data, and convert it from parallel to serial.

This encoding ensures that the encoded pixel data BLU, GRN, and RED is transferred through difference data channels 0, 1, and 2 of the T.M.D.S. link during the data transfer period, as shown in FIG. 2. Encoded control signals HSYNC, VSYNC, and CTL0 to CTL3 are transferred through channels 0, 1, and 2 in the blanking period. Note that the number of channels for difference data with dual-link T.M.D.S. is six (two for each of RGB).

In a T.M.D.S. link, encoding is performed to ensure a reduction (minimization) in the number of transitions in the data. This minimization in the number of data transitions enables a reduction in the electromagnetic radiation in the transfer path. During the blanking period, on the other hand, synchronization characters SC00=0010101011., SC01=1101010100, SC10=0010101010, and SC11=101010101 in which the number of transitions has been increased are transferred.

More specifically, two bits of information are transferred in each channel by using these four synchronization characters SC00 to SC11. If the information (VSYNC, HSYNC)=(00), (01), (10). (11) is to be transferred, by way of example, each of the synchronization characters SC00, SC01, SC10, and SC11 is transferred through channel 0.

Note that the transmitter 50 transfers serial data in parallel in the channels 0, 1, and 2, and transfers through a clock channel C a reference clock signal CLK having a frequency that is 1/10 that of the transfer rate of the channels 0, 1, and 2. In other words, 10 bits of data are transferred in each of the channels 0, 1, and 2 during one cycle of the reference clock signal CLK.

Recovery/decoders 62, 64, and 66 comprised by a T.M.D.S. receiver 60 receive the serial data transferred by the channels 0, 1, and 2, and recover and decode the data. An inter-channel alignment section 68 comprised by the receiver 60 detects any skew between channels and aligns the phases of data in the channels. It then supplies the recovered stream to a later-stage display controller.

A skew adjustment circuit is necessary within the T.M.D.S. receiver 60 to detect and remove any skew between the data and the clock, and extract the correct data. It also detects character boundaries in 10-bit units, making it necessary for a byte synchronizer (broadly speaking: a data synchronization circuit) for delimiting the data at each character for output to a later stage. It is further necessary to have an inter-channel synchronizer (broadly speaking: a data synchronization circuit) for adjusting skew between the plurality of data channels.

Specific examples of the configurations of these skew adjustment circuit, byte synchronizer, and inter-channel synchronizer comprised by the receiver 60 are given below.

2. Skew Adjustment Circuit

Figure 3:
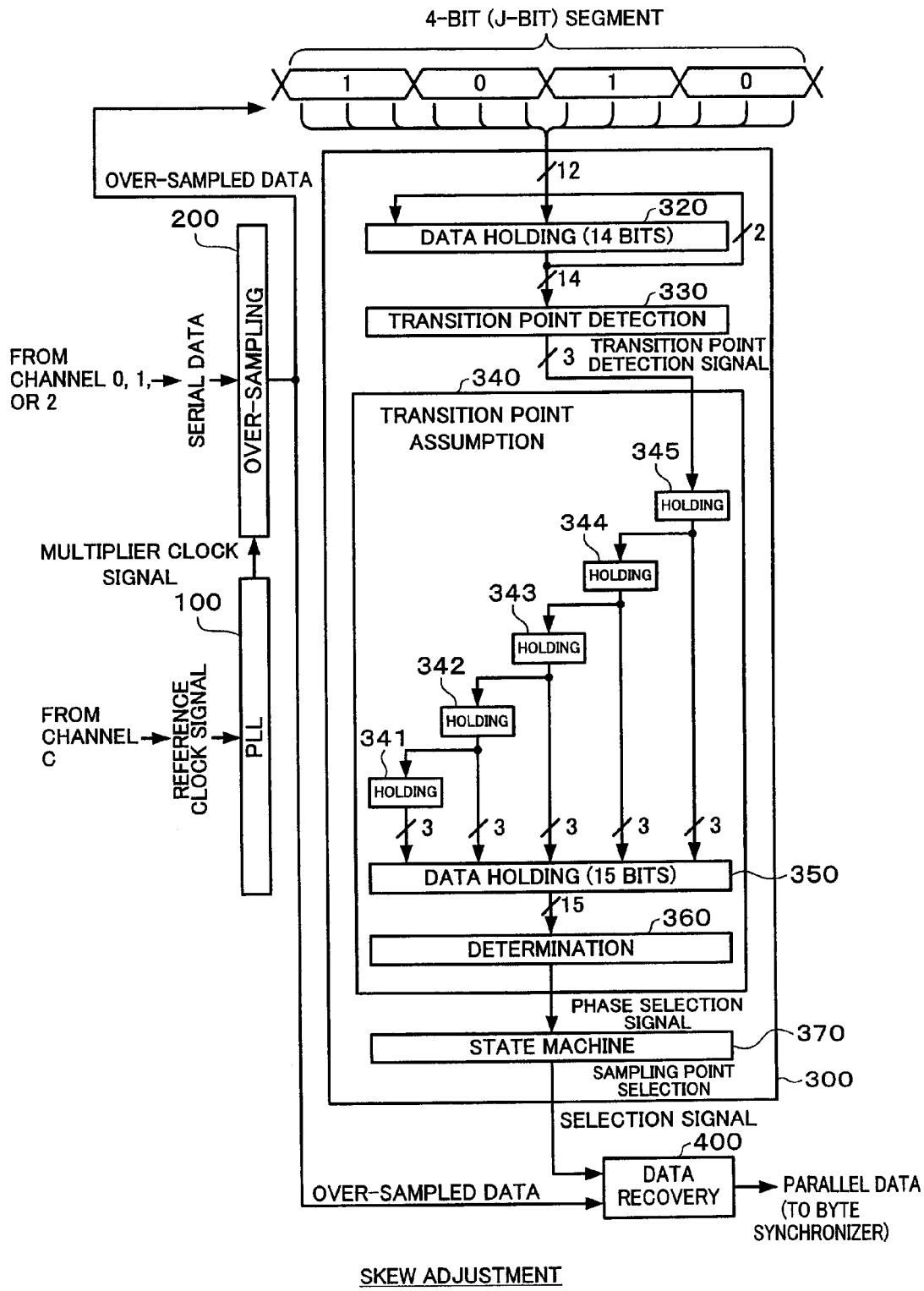
FIG. 3 shows an example of the configuration of a skew adjustment circuit in accordance with this embodiment.

An example of the configuration of the skew adjustment circuit in accordance with this embodiment is shown in FIG. 3. This skew adjustment circuit detects and removes any skew from the oversampled serial data, and extracts corrected data. Note that the skew adjustment circuit and sampling point selection section of this embodiment do not necessarily comprise the structural elements shown in FIG. 3, so some of them could be omitted.

A PLL circuit 100 generates a multiplier clock signal, based on the thus-received reference clock signal. The frequency of the reference clock signal is 1/10 of the transfer rate in the data channels and the frequency of the multiplier clock signal is three times the transfer rate in the data channels. By using this multiplier clock signal, the oversampling section 200 performs oversampling at three times (broadly speaking: I times) with respect to the received serial data, and outputs that oversampled data.

A sampling point selection section 300 (a sampling phase selection section and phase detection section) receives the oversampled data from the oversampling section 200 and performs comparison processing (such as an exclusive OR) on the oversampled data. It then assumes the transition points of the serial data, based on the comparison result, and outputs a selection signal for selecting a sampling point from among the oversampling points.

A data recovery section 400 (phase adjustment section) receives the oversampled data from the oversampling section 200 and also a selection signal from the sampling point selection section 300. It then outputs the oversampled data at the sampling point (sampling phase) selected by the selection signal, as sampled data of the serial data. At this point, the serial data is converted into parallel data and output to a later-stage circuit (byte synchronizer).

The sampling point selection section 300 comprises a data holding section 320 that holds oversampled data from the oversampling section 200. This data holding section 320 fetches data (sampled values) that have been oversampled over a 4-bit segment of serial data (broadly speaking: a J-bit period, where J can be assumed to be an integer greater than 3). Since the oversampling is done at three times (I times) the serial data rate, 12 points (I×J points) of oversampled data are fetched for four bits (J bits) of serial data. The data holding section 320 holds 14 points of oversampled data: these 12 points plus two points (H points) from immediately before (or immediately after). For that reason, the data holding section 320 is configured of a 14-bit flip-flop.

The sampling point selection section 300 comprises a transition point detection section 330, a transition point assumption section 340, and a state machine 370.

In this case, the transition point detection section 330 detects transition points of serial data, based on the oversampled data (14 bits) held by the data holding section 320. More specifically, it performs comparison processing on the oversampled data (such as a logical exclusive OR) in 4-bit (J-bit) segment units of the serial data, and outputs transition point detection signals (of, for example, three bits) obtained by this comparison processing.

2.1 Transition Point Detection Section

Figure 4:
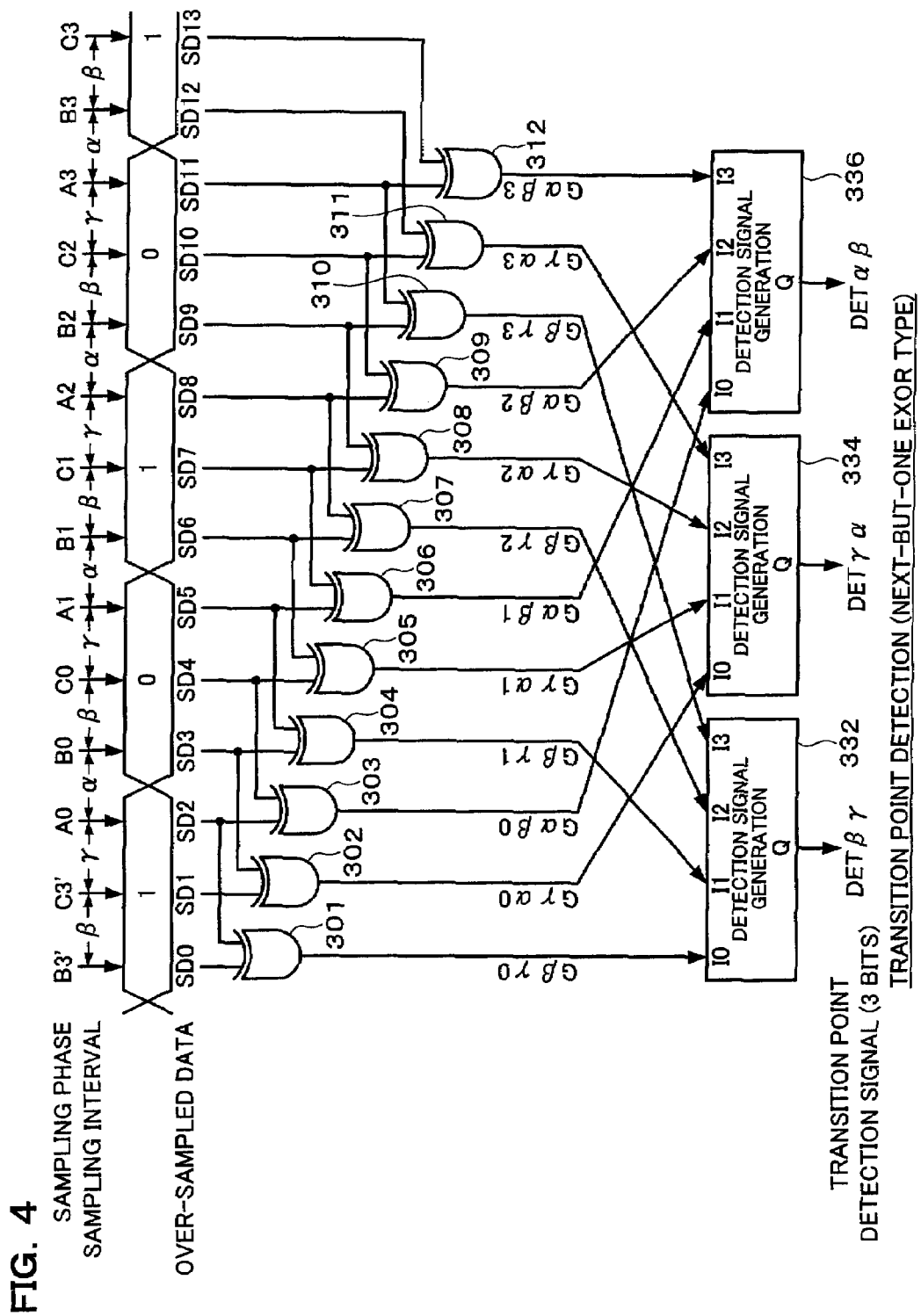
FIG. 4 shows an example of the configuration of a next-but-one EXOR type transition point detection section in accordance with this embodiment.

An example of the configuration of the transition point detection section 330 is shown in FIG. 4. Note that B3' and C3' in FIG. 4 are equivalent to the 2 bits from the output of the data holding section 320 of FIG. 3 (the final two bits of the previous stage) that are fed back to the input thereof. A0, B0, C0 . . . A3, B3, C3 correspond to the 12 bits that are input to the data holding section 320.

The transition point detection section 330 of FIG. 4 comprises exclusive OR gates (hereinafter referred to as "EXOR gates") 301 to 312 that obtain an exclusive OR from the input of next-but-one oversampled data SD0 to SD13 of the serial data. It also comprises detection signal generation sections (all-bits transition pattern detection sections) 332, 334, and 336 that generate transition point detection signals DETβγ, DETγα, and DETαβ, based on the outputs of these EXOR gates 301 to 312.

More specifically, the detection signal generation section 332 receives outputs Gβγ0 to Gβγ3 of the EXOR gates 301, 304. 307, and 310, which detect whether or not there is a data transition point in the intervals β+γ, and outputs a transition point detection signal DETβγ. The detection signal generation section 334 receives outputs Gγα0 to Gγα3 of the EXOR gates 302, 305, 300, and 311, which detect whether or not there is a transition point of the serial data in the intervals γ+α, and outputs a transition point detection signal DETγα. Similarly, the detection signal generation section 336 receives outputs Gαβ0 to Gαβ3 of the EXOR gates 303, 306, 309, and 312, which detect whether or not there is a data transition point in the intervals α+β, and outputs a transition point detection signal DETαβ.

The operation of the transition point detection section 330 will now be described with reference to FIGS. 5 and 6.

Figure 5:
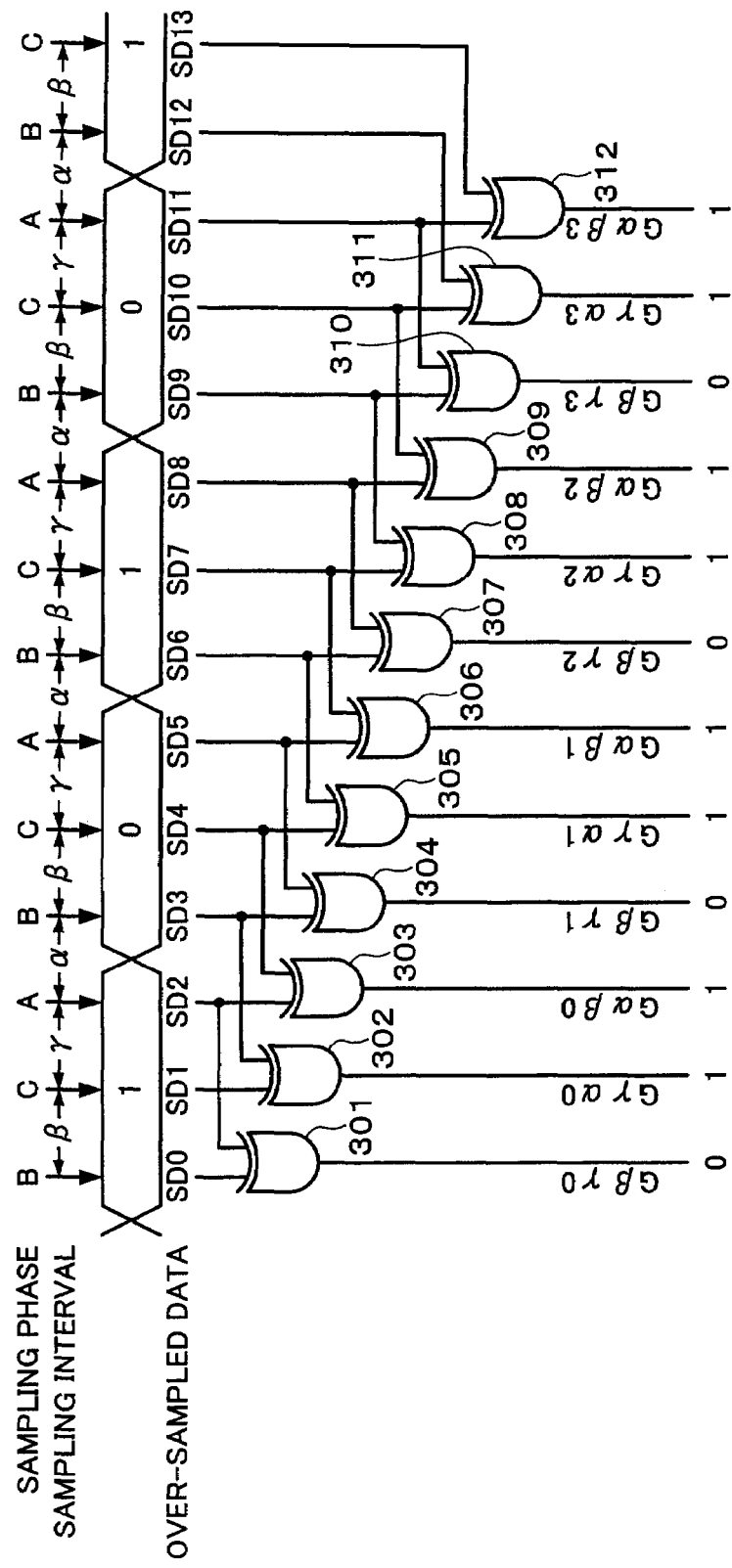
FIG. 5 is illustrative of the operation of the transition point detection section.

FIG. 5 shows a state in which a sampling phase C, of three sampling phases A, B, and C is positioned at the substantial center between two adjacent data transition points.

In this state, the outputs Gβγ0 to Gβγ3 of the EXOR gates 301, 304, 307, and 310 that obtain an exclusive OR of oversampled data in sampling phases B and a at either end of each β+γ interval are 0.

The outputs Gγα0 to Gγα3 of the EXOR gates 302, 305, 308, and 311 that obtain an exclusive OR of oversampled data in sampling phases C and B at either end of each γ+α interval are 1.

The outputs Gαβ0 to Gαβ3 of the EXOR gates 303, 306, 309, and 312 that obtain an exclusive OR of oversampled data in sampling phases A and C at either end of each α+β interval are 1.

The presence of a data transition point in the α interval is determined based on these outputs of the EXOR gates. From this, it is determined that the sampling phase that is suitable for detecting serial data is C.

Figure 6:
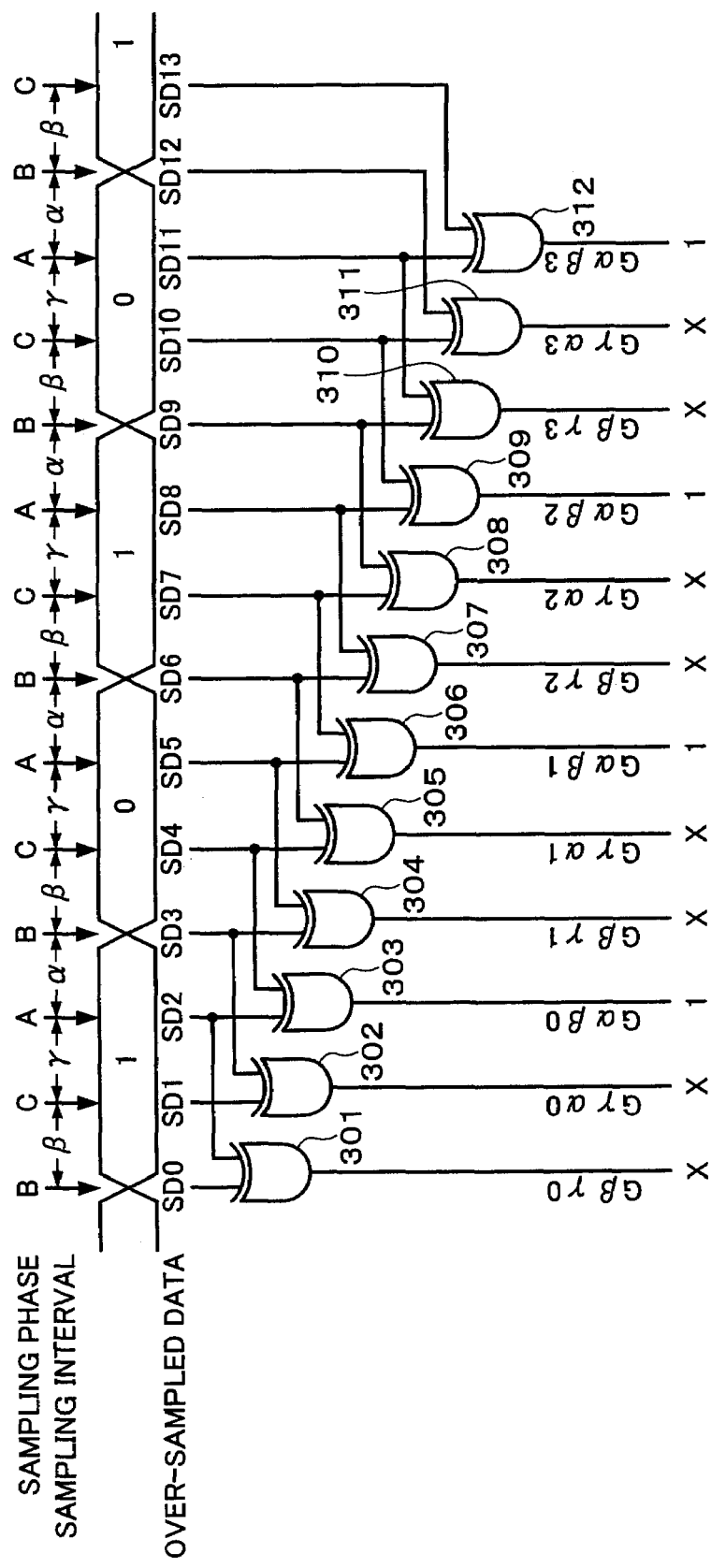
FIG. 6 is further illustrative of the operation of the transition point detection section.

FIG. 6 shows a state in which the sampling phase B, of the three sampling phases A, B, and C, is positioned in the neighborhood of a data transition point.

In this state, the values of the outputs Gβγ0 to Gβγ3 of the EXOR gates 301, 304, 307, and 310 that obtain an exclusive OR of oversampled data in sampling phases B and A at either end of each β+γ interval and the outputs Gγα0 to Gγα3 of the EXOR gates 302, 305, 308, and 311 that obtain an exclusive OR of oversampled data in sampling phases C and B at either end of each γ+α interval are either 1 or 0, so it is not possible to determine which value has been output thereby. (An output of such an undetermined value is denoted by "X".)

The outputs Gαβ0 to Gαβ3 of the EXOR gates 303, 306, 309, and 312 that obtain an exclusive OR of oversampled data in sampling phases A and C at either end of each α+β interval are 1.

With the state shown in FIG. 6, it could be considered from the contents of the data that both the output Gβγ (Gβγ0 to Gβγ3) and the output Gγα (Gγα0 to Gγα3) are 0. If the output Gαβ (Gαβ to Gαβ3) is 1, however, it is known that the transition points of the serial data are within the α or β interval. From this, it is possible to determine that the suitable sampling phase to be selected for detecting the serial data is C or A. The relationships between all the possibilities that can occur are shown in FIG. 7.

It is dangerous to base the determination of data transition point on a small sample. It is therefore preferable to perform an initial skew adjustment when the transition point detection results match over a predetermined data length. To perform this filter operation, this embodiment uses a synchronization character that is transferred during a blanking period of the image signal. The setting is such that the number of transitions in pixel data is reduced, whereas the number of transitions in synchronization characters is increased. The use of such synchronization characters makes it possible to simplify the algorithm and ensure that the number of gates of the circuit does not increase too much. Since there are substantially the same numbers of signal rises and falls in the synchronization characters, it is possible to detect transition points based on an unbiased measurements of the two.

More specifically, one of the synchronization characters SC00=0010101011, SC01=1101010100", SC10=0010101010, and SC11=1101010101 is transferred during the blanking period, as previously described with reference to FIG. 2. For instance, SC01 is transferred if the information to be sent is (VSYNC, RSYNC)=(0, 1). Similarly, SC10 is transferred if the information to be sent is (VSYNC, HSYNC)=(1, 0).

The present inventors have discovered the characteristics described below within 20 bits (a predetermined number of bits: J×N bits) transferred continuously during the blanking period. In other words, they have discovered that the all-bits transition pattern "0101" or "1010" (more accurately: "01010" or "10101") of a 4-bit segment always occurs at least twice within these 20 bits, regardless of which bit the synchronization character starts at.

Figure 8:
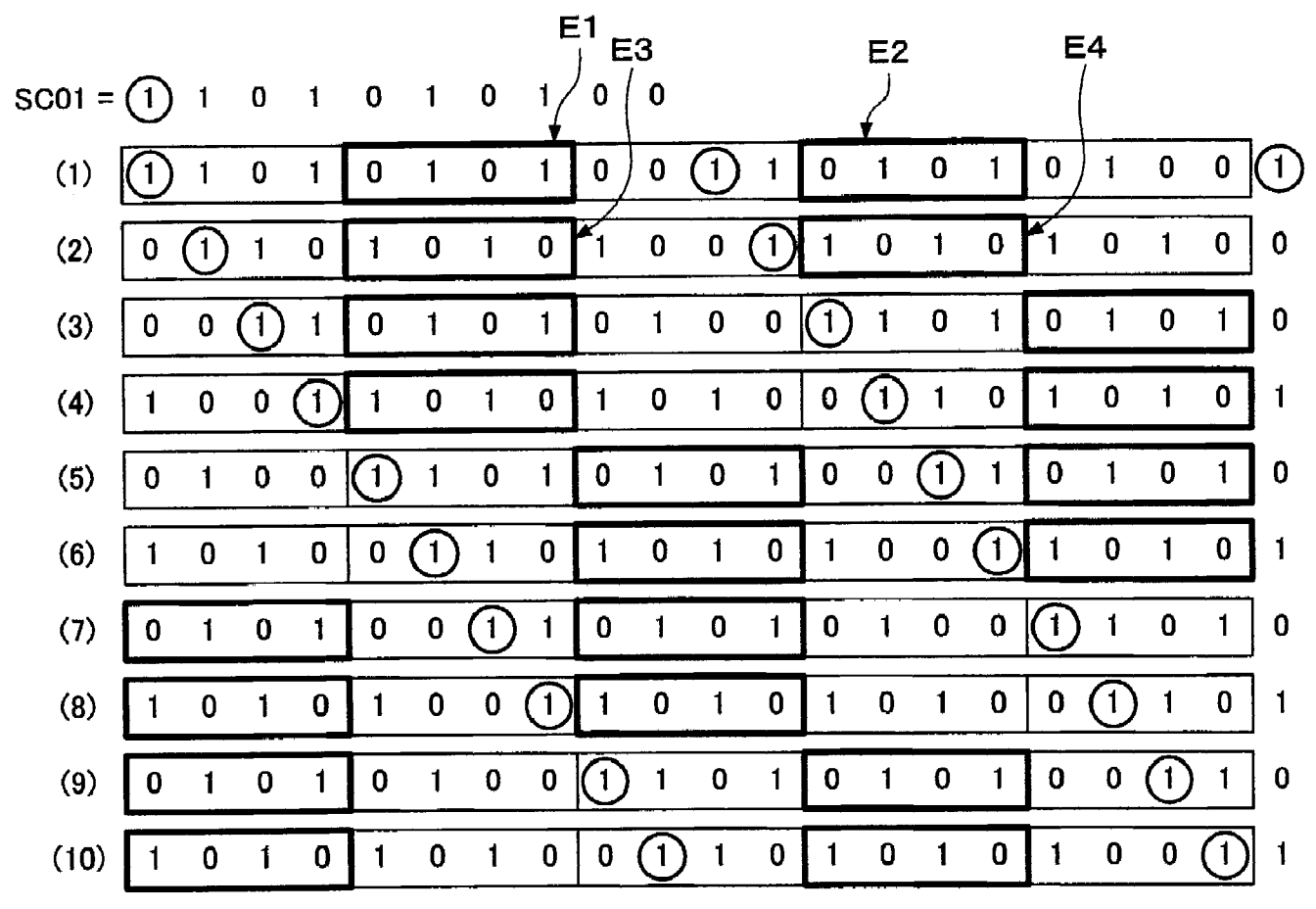
Figure 9:
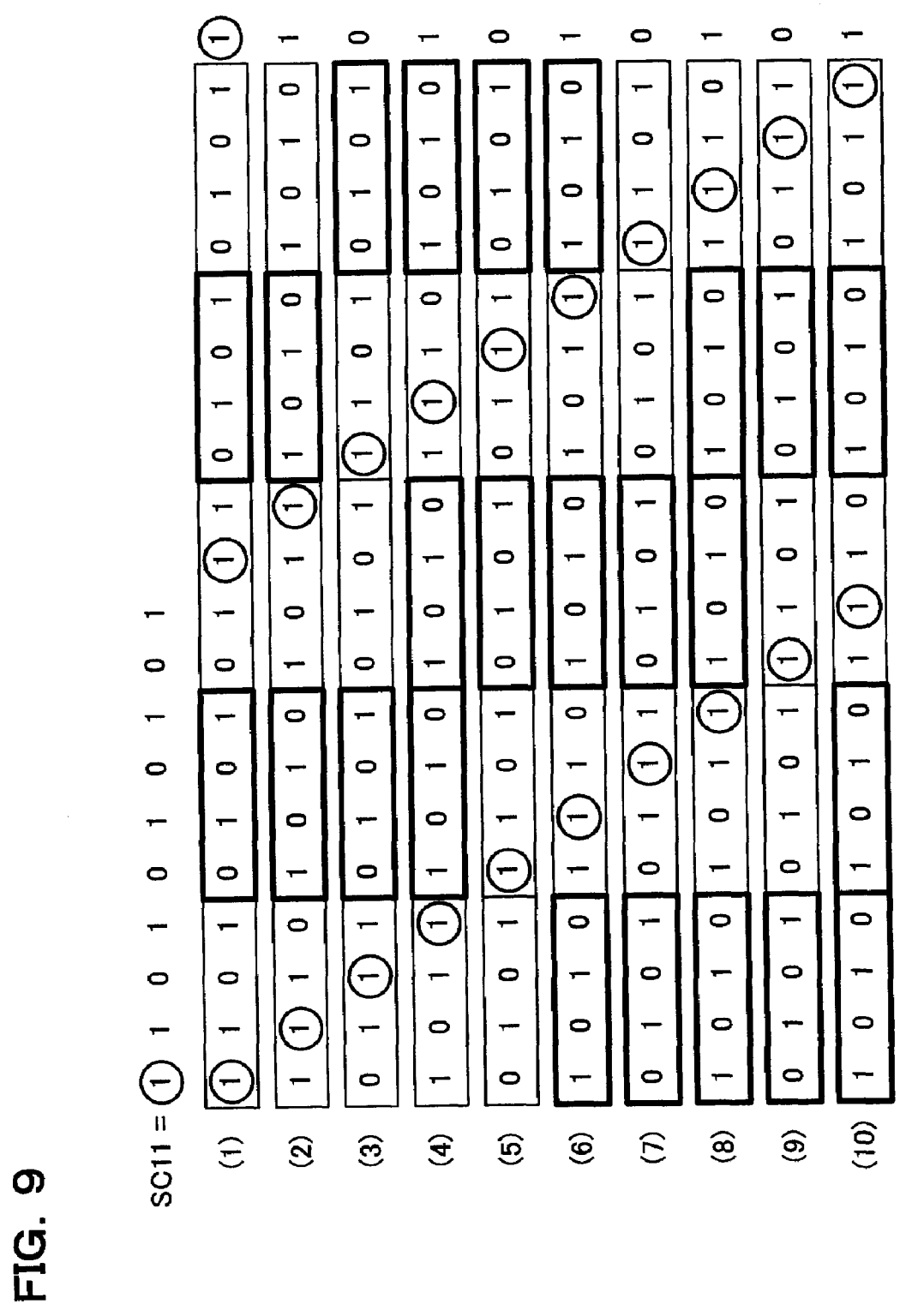

This situation is shown in FIGS. 8 and 9. FIG. 8 shows ten sets of 20 bits formed by the synchronization character SC01=1101010100. Similarly, FIG. 9 shows ten sets of 20 bits formed by the synchronization character SC11=1101010101. The 20 bits of each of the other two synchronization characters SC00 and SC10 can be considered to be inversions of the bits of FIGS. 8 and 9.

The example shown at (1) in FIG. 8 is of 20 bits where the synchronization character SC01 starts at the first bit. In this case, an all-bits transition pattern "10101" of the 4-bit segment occurs at two locations, as shown at E1 and E2.

The example shown at (2) in FIG. 8 is of 20 bits where the synchronization character SC01 starts at the second bit. In this case too, an all-bits transition pattern "1010" of the 4-bit segment occurs at two locations, as shown at E3 and B4.

Similarly, the examples shown at (3) to (10) in FIG. 8 and (1) to (10) in FIG. 9 all have an all-bits transition pattern of a 4-bit segment at at least two locations within the 20 bits.

With this embodiment, the detection signal generation sections 332, 334, and 336 of FIG. 4 first detect an all-bits transition pattern (an alternating pattern formed by values where the logical values of bit I and bit I+1 are different). In other words, if the 4 bits exhibit all-bits transition pattern in a 4-bit segment of the serial data, the same transition point ought to be detects at four locations. If the detection signal generation sections 332, 334, and 336 of an AND method (first method) in accordance with this embodiment detect the same transition point at four (J) locations in a four-bit (J-bit) segment of the serial data, they determine that a suitable transition point has been detected. The detection signal generation section sets the transition point detection signals DETβγ, DETγα, and DETαβ to 1 (active).

Figure 10A:
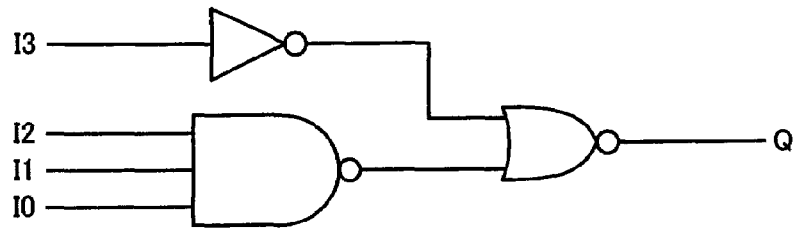
FIGS. 10A and 10B show examples of the configurations of a detection signal generation section using an AND method and a detection signal generation section using an at-least-three method.

An example of the configuration of a detection signal generation section that uses the AND method is shown in FIG. 10A. This detection signal generation section has an output Q that is 1 when all of inputs thereof I0 to I3 are 1 (active), but Q is 0 (inactive) in all other cases.

With the AND method, by way of example, the detection signal generation section 332 of FIG. 4 outputs DETβγ=1 when all of Gβγ0 to Gβγ3 are 1. Similarly, the detection signal generation section 334 outputs DETγα=1 when all of Gγα0 to Gγα3 are 1, Furthermore, the detection signal generation section 336 outputs DETαβ=1 when all of Gαβ0 to Gαβ3 are 1.

Figure 10B:
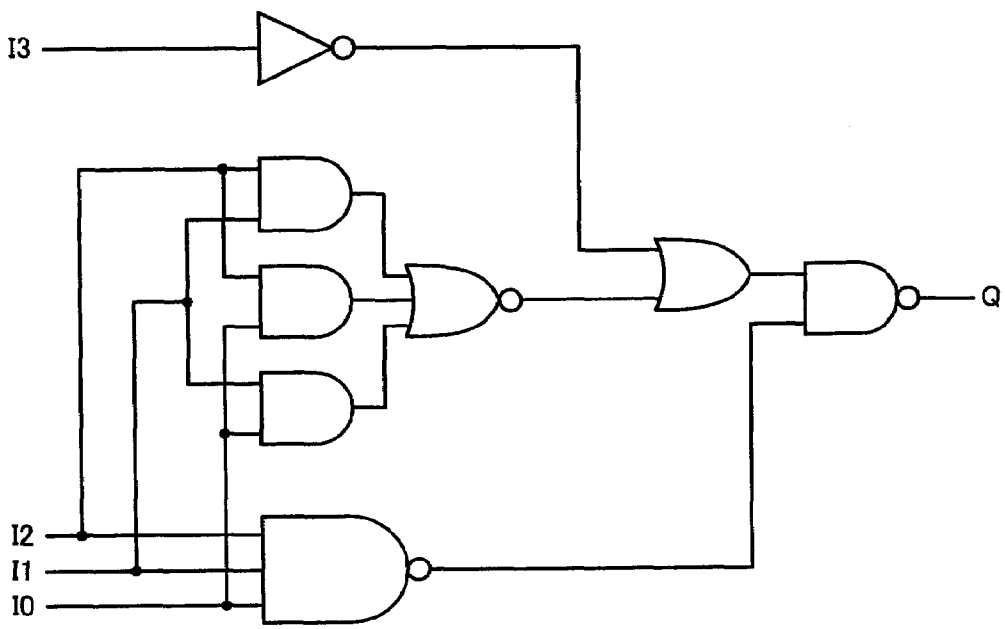

Note that an example of the configuration of a detection signal generation section using an at-least-three method (a second method) is shown in FIG. 10B. The output Q of this detection signal generation section is 1 when at least three of the inputs 10 to 13 thereof are 1, but Q is 0 (inactive) in all other cases. In other words, if the same transition point is detected at at least three locations in a 4-bit segment of the serial data by a detection signal generation section that uses the at-least-three method, it is determined that a suitable transition point has been detected and the transition point detection signal goes to 1 (active).

2.2 Transition Point Assumption Section

The description now turns to the transition point assumption section 340 of FIG. 3.

The transition point assumption section 340 receives transition point detection signals from the transition point detection section 330 (DETβγ, DETγα, and DETαβ of FIG. 4), and assumes the transition points. It generates a sampling phase selection signal based on the result of this assumption, and outputs it to the state machine 370.

In this case, the detection signal generation sections 332, 334, and 336 comprised by the transition point detection section 330 uses either the AND method (FIG. 10A) or the at-least-three method (FIG. 10B), to obtain different transition point assumption results.

If a detection signal generation section that uses the AND method of FIG. 10A is used, byway of example, the transition points are assumed as shown in FIG. 11A. Note that the selection of the sampling phase from the result of assuming the transition points is done in accordance with the method shown in FIG. 7.

In case 1, four transition points are detected in each of the γ+α interval and the α+β interval, as shown at F1 and F2. On the other hand, no transition points are detected in the β+γ interval. Therefore, the transition point detection signal from the transition point detection section 330 are such that DRT γα=DETαβ=1 and DETβγ. For that reason, it is determined that the transition points are in the γ+α intervals, and also that transition points are in the α+β intervals. It is therefore assumed that transition points are present in the α intervals and thus the suitable sampling phase (phase selection signal) to be selected is C.

In case 2, four transition points are detected in the γ+α interval, as shown at F3. However, there are only three transition points detected in the α+β; not four. Similarly, four transition points are not detected in the β+γ interval. Therefore, the transition point detection signals are such that DETγα=1 and DETαβ=DETβγ=0. If the same transition point is detected at four locations with the AND method, it is determined that the transition points are in those intervals. It is therefore assumed that transition points are present in the γ+α intervals and thus the suitable sampling phase (phase selection signal) to be selected is B or C. In practice, there are three transitions in the α interval and one transition in the γ interval, so it is preferable to use C as the sampling phase. However, it is determined that the transition points are in the γ+α intervals so it is not possible to determine which of the sampling phase B and C should be selected.

In case 3, four transition points are detected in the γ+α interval, as shown at FIG. 4. However, four transition points are not detected in the other α+β and β+γ intervals. Therefore, the transition point detection signals are such that DETγα=1 and DETαβ=DETβγ=0. It is therefore assumed that transition points are present in the γ+α intervals and thus the suitable sampling phase to be selected is B or C.

In case 4, four transition points are not detected in any of the γ+α, α+β, and β+γ intervals. Therefore, the transition point detection signals are such that DET α=DETαβ=DETβγ=0. TN this case, therefore, there is no interval in which four transition points are detected, so there is no sampling phase that can be selected as suitable.

If the detection signal generation section using the at-least-three method of FIG. 10B is used, however, the transition point can be assumed as shown in FIG. 11B.

In case 5, four transition points are detected in each of the γ+α and α+β intervals, as shown at F5 and F6, so DETγα=DETαβ=1, DETβγ=0. in other words, at least three transition points are detected in each interval, so it is determined that there is a transition point in the γ+α interval and also another transition point in the α+β interval. It is therefore possible in this case to assume that transition points are present in the α intervals and thus the suitable sampling phase to be selected is C.

In case 6, four transition points are detected in the γ+α interval and three transition points are detected in the α+β interval, as shown at F7 and F8, so DETγα=DETαβ=1 and DETβγ=0. In other words, since at least three transition points are detected in two cases, it is determined that there is a transition point in the γ+α interval and also a transition point in the α+β interval. In this case, therefore, it is assumed that transition points are present in the α interval and thus the suitable sampling phase to be selected is C.

In case 7, four transition points are detected in the γ+α interval, as shown at F9, but no transition points are detected in the other α+β and β+γ intervals, so DETγα=1 and DETαβ=DETβγ=0. In this case, therefore, it is assumed that transition points are present in the γ+α intervals and thus the suitable sampling phase to be selected is B or C.

In case 8, three transition points are detected in the γ+α interval and three transition points are detected in the α+β interval, as shown at F10 and F11, so DETγα=DETαβ=1 and DETβγ=0. For that reason, it is determined that the transition points are in the γ+α intervals and also that the transition points are in the α+β intervals, in a similar manner to case 1. In this case, therefore, it is assumed that transition points are present in the α intervals and thus the suitable sampling phase to be selected is C.

If the transition point assumption section 340 has found the suitable sampling phase to be selected, it outputs a phase selection signal selecting that sampling phase to the state machine 370. If it could not find a suitable sampling phase to be selected, on the other hand, it outputs a phase selection signal that maintains the current sampling phase to the state machine 370.

The description now turns to a specific example of the configuration of the transition point assumption section 340, with reference to FIG. 3.

The transition point assumption section 340 holds transition point detection signals (DETγα, DETαβ, and DETβγ), which have been obtained by performing comparison processing on the 4-bit segment of serial data, for five segments (N segments). More specifically, the transition point assumption section 340 comprises serially-connected holding sections (3-bit flip-flops) 341, 342, 343, 344, and 345, as shown in FIG. 3. These holding sections 341 to 345 hold corresponding first to fifth transition point detection signals (first to Nth transition point detection signals) that are obtained by first to fifth 4-bit segments (first to Nth J-bit segments). These first to fifth transition point detection signals are supplied in parallel to a data holding section (15-bit flip-flop) 350. This ensures that the data holding section 350 can accumulate the 3-bit transition point detection signal in the 4-bit segment of the serial data for five segments (for 20 bits of serial data).

The accumulated transition point detection signals for five segments are supplied to a determination section 360. The determination section 360 assumes the transition points of the serial data, based on transition point detection signals that express the same result, on condition that the transition point detection signals for at least two of the five segments indicate the same result. The generation of the phase selection signal is based on the result of this assumption and output to the state machine 370.

In other words, the all-bits transition pattern of a 4-bit segment occurs at at least two locations in a continuous string of 20 bits (J×N bits) comprising a synchronization character that is transferred during the blanking period, as previously described with reference to FIGS. 8 and 9. This feature is utilized by this embodiment to perform skew adjustment.

Figure 12A:
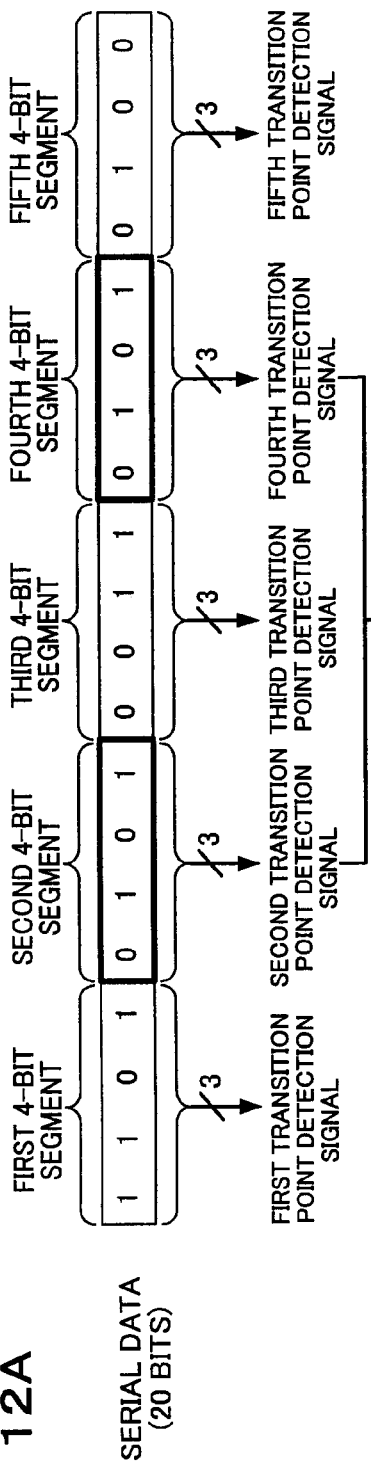
FIGS. 12A and 12B are illustrative of a method of assuming transition points based on transition point detection signals, when the transition point detection signals for at least two segments indicate the same result.

Taking the 20 bits shown in FIG. 12A (equivalent to (1) in FIG. 8) as an example, the second and fourth 4-bit segments form an all-bits transition pattern, so the second and fourth transition point detection signals indicate the same result. In this case, therefore, the condition is satisfied that the transition point detection signals for at least two segments indicate the same result, so the phase selection signal is generated based on the second and fourth transition point detection signals for output to the state machine 370.

Figure 12B:
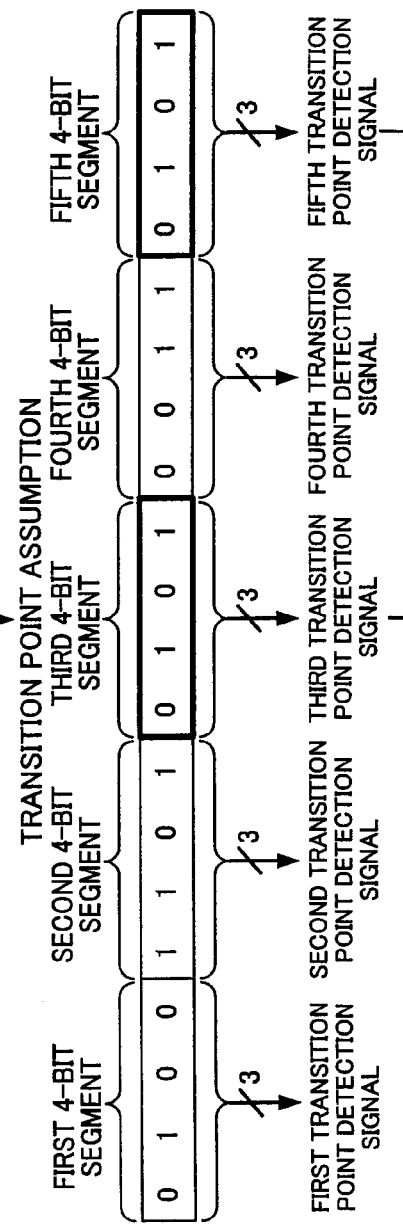

Similarly, the third and fifth 4-bit segments in the 20 bits shown in FIG. 12B (equivalent to (5) in FIG. 8) form an all-bits transition pattern, so the third and fifth transition point detection signals indicate the same result. In this case too, therefore, the condition is satisfied that the transition point detection signals for at least two segments indicate the same result, so the phase selection signal is generated based on the third and fifth transition point detection signals for output to the state machine 370.

If it is not possible to satisfy the condition that the transition point detection signals for at least two segments indicate the same result, on the other hand, the determination section 360 outputs a phase selection signal that maintains the current sampling phase to the state machine 370. In other words, the determination section 360 acts as a filter to ensure that the transition point detection signals are not transferred to the later-stage circuit in this case.

This determination of the determination section 360 on this basis makes it possible to base the skew adjustment (change the sampling phase) solely on data (a synchronization character) transferred during the blanking phase.

With the conventional example disclosed in Japanese Patent Publication No. 11-511926 (U.S. Pat. No. 5,905,769), for instance, the skew adjustment is based not only on a synchronization character transferred during the blanking phase but also on pixel data transferred during the data transfer period.

With pixel data in which the number of transitions has not been maximized, however, the small number of transitions could result in differing numbers of rises and falls in the signal. If skew adjustment is performed on pixel data with such a signal state, it is not possible to handle the rises and falls in the signal in an unbiased manner. For that reason, there is a possibility that the sampling position after skew adjustment by the conventional skew adjustment circuit will be shifted from the correct position.

In contrast thereto, this embodiment ensures that skew adjustment is based solely on a synchronization character transferred in the blanking period and the number of transitions within the synchronization character is maximized, so that the ratio of the number of rises to the number of falls in the signal is close to 1. It is therefore possible to detect transition points based on an unbiased measurement of signal rises and falls. In addition, since the number of transitions is maximized, it is possible to perform sampling in portions where changes in the amplitude of a difference signal are minimal. The above-described configuration enables stable and accurate skew adjustment.

Figure 13:
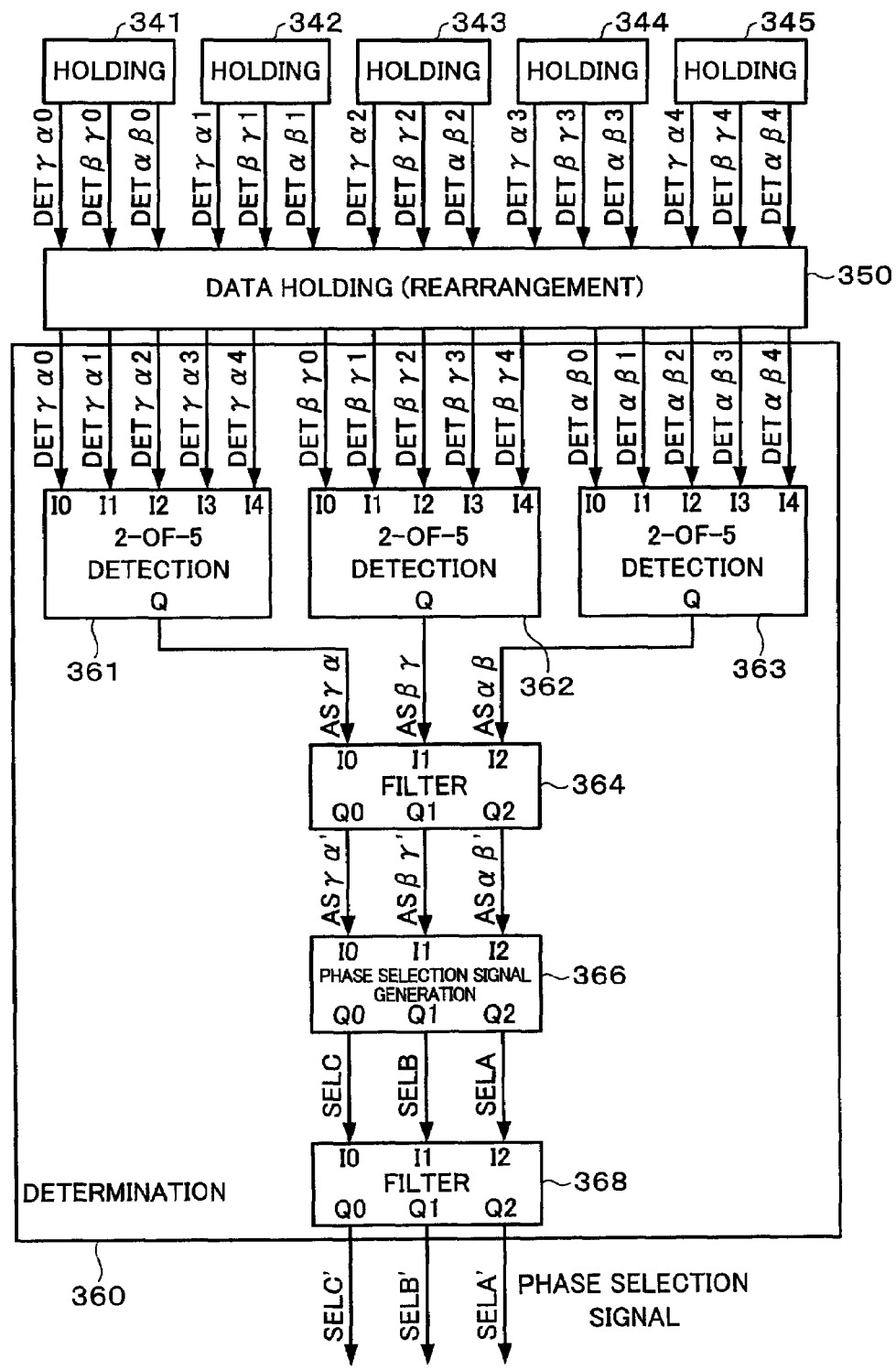
FIG. 13 shows an example of the configuration of the determination section.

An example of the configuration of the determination section 360 is shown in FIG. 13.

The first to fifth transition point detection signals DETγα0 to DETαβ0, DETγα1 to DETαβ1, DETγα2 to DETαβ2, DETγα3 to DETαβ3, and DETγα4 to DETαβ4, which were held sequentially in the holding sections 341, 342, 343, 344, and 345, are held in the data holding section 350. The data holding section 350 rearranges these held transition point detection signals and outputs these signals to 2-of-5 detection sections 361, 362, and 363. Specifically, DETγα0 to DETγα4, DETβγ0 to DETβγ4, and DETαβ0 to DETαβ4 are input to the 2-of-5 detection sections 361, 362, and 363, respectively.

Figure 14:
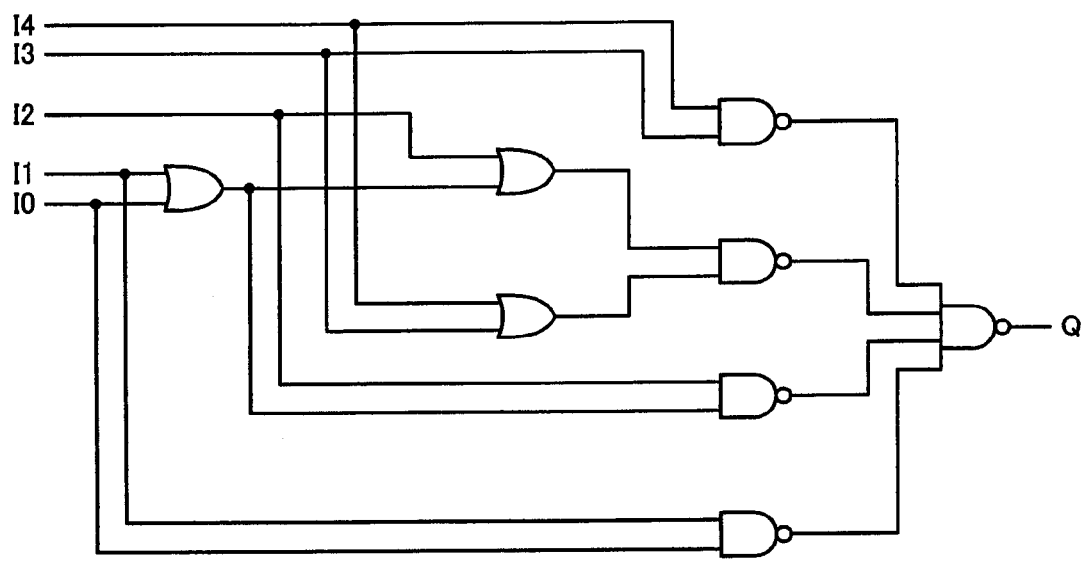
FIG. 14 shows an example of the configuration of the 2-of-5 detection section (synchronization character detection section)

In this case, the 2-of-5 detection sections (synchronization character detection sections) 361 to 363 are circuits with outputs Q that go to 1 when at least two of inputs I0 to I4 are 1 (active), but are 0 (inactive) otherwise, as shown in FIG. 14.

Consider a case in which the second transition point detection signals DETγα1 to DETαβ1 of the second 4-bit segment and the fourth transition point detection signals DETγα3 to DETαβ3 of the fourth 4-bit segment indicate the same result, as shown in FIG. 12A. In other words, assume that DETγα1=DETγα3=1, DETβγ1=DETβγ3=0, and DETαβ1=DETαβ3=1, by way of example.

In this case, an output ASγα of the 2-of-5 detection section 361 of FIG. 13 is 1, an output ASβγ of the 2-of-5 detection section 362 is 0, and an output ASαβ of the 2-of-5 detection section 363 is 1. The determination standard shown in FIG. 7 therefore ensures that it is assumed that the intervals in which transition points are present are a, and the sampling phase to be selected is C.

This filtering performed by the 2-of-5 detection sections 361 to 363 ensure that these transition point detection signals are passed onto the later-stage circuit only if the transition point detection signals for at least two segments indicate the same result.

If each of the transition point assumption signals ASγα, ASβγ, and ASαβ match twice (broadly speaking: at least twice) in succession, a filter section 364 of FIG. 13 determines that these ASγα, ASβγ, and ASαβ a signals are correct and outputs them as ASγα', ASβγ', and ASαβ'.

Figure 15:
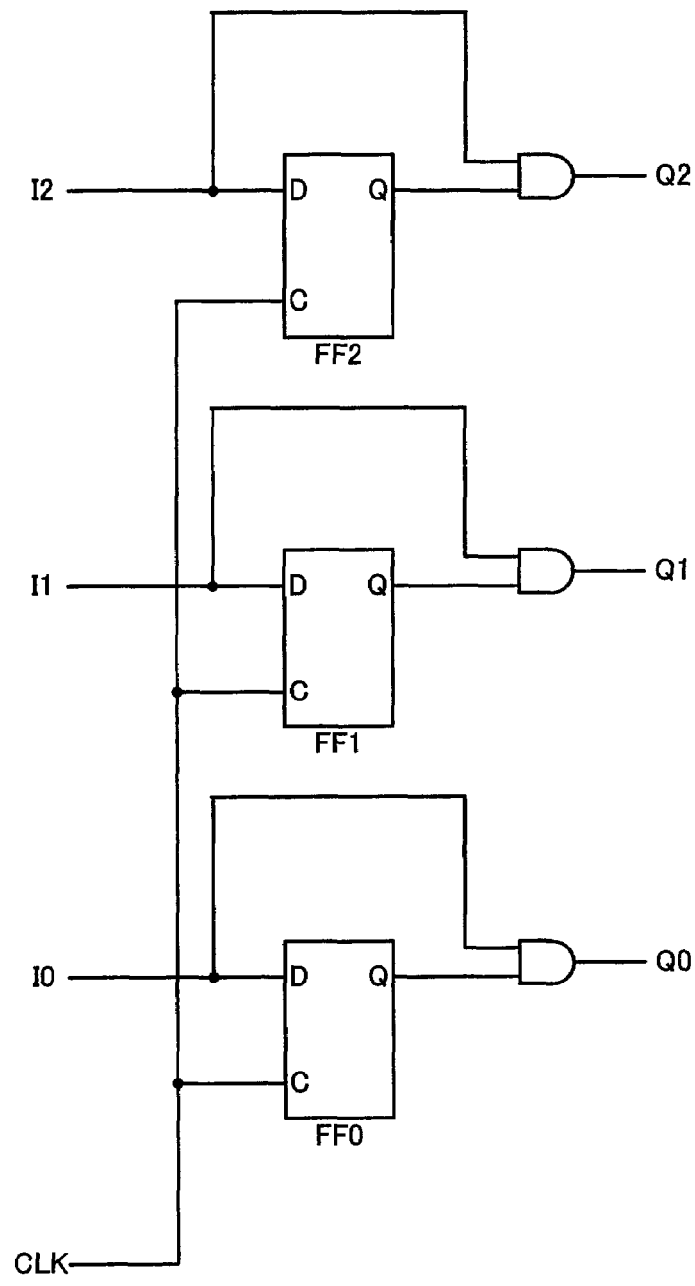
FIG. 15 shows an example of the configuration of the filter section.

An example of the configuration of the filter section 364 is shown in FIG. 15. Outputs Q0 to Q3 of the filter section of FIG. 15 are 1 when both I0 to I3 that are held in flip-flops FF0 to FF2 at a first timing of the clock signal CLK and I0 to I3 that are held in FF0 to FF2 at the subsequent second timing are 1 (active). If ASγα=1, ASβγ=0, and ASαβ=1 at the first timing of CLK and also ASγα=1, ASβγ=0, and ASαβ=1 at the second timing of CLK, ASγα'=1, ASβγ'=0, and ASαβ'=1.

A phase selection signal generation section 366 in FIG. 13 receives the transition point assumption signal ASγα', ASβγ', and ASαβ', and outputs sampling phase selection signals SELC, SELB, and SELA. In this case. SELC, SELB, and SELA are signals for selecting sampling phases C, B, and A, respectively.

Figures 16A, 16B:
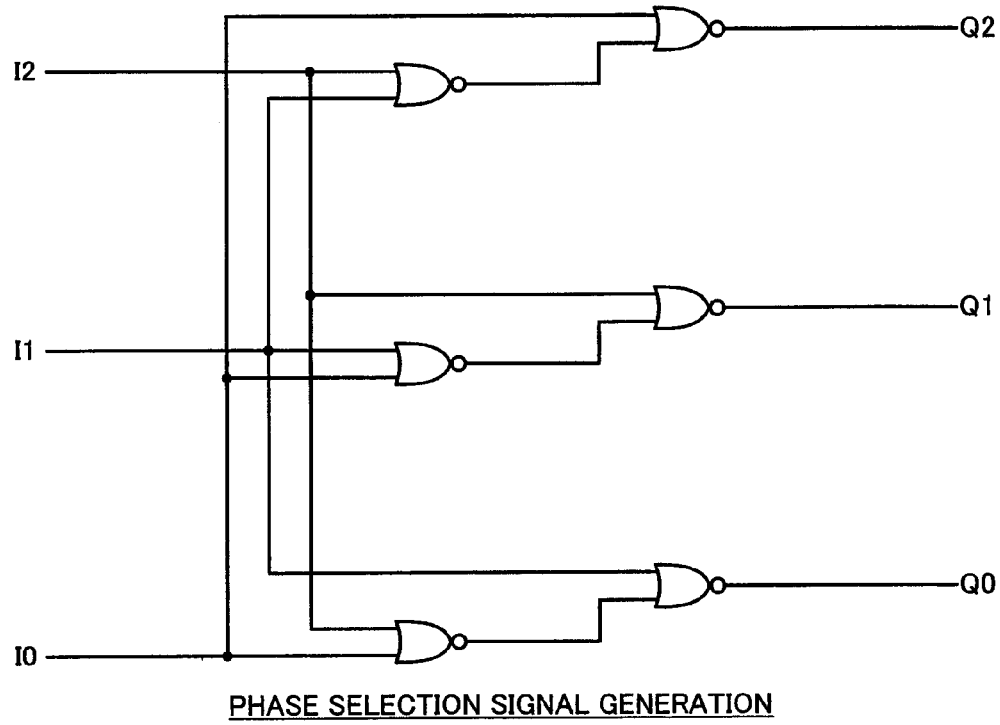
FIGS. 16A and 16B show an example of the configuration of the phase selection signal generation section and a truth table thereof.

An example of the configuration of the phase selection signal generation section 366 is shown in FIG. 16A, with a truth table thereof being shown in FIG. 16B. This truth table corresponds to that in FIG. 7. If ASαβ'=1, ASβγ'=0, and ASγα'=1, by way of example, it is assumed that transition points are present in the α interval and thus SELC goes to 1 to select sampling phase C.

A filter section 368 of FIG. 13 determines that these phase selection signals SELA, SELB, and SELC are correct if SELA, SELB, and SELC match twice (broadly speaking: at least twice) in succession, and outputs them as SELA', SELB', and SELC'. This filter section 368 has a configuration similar to that shown in FIG. 15.

Note that the configuration shown in FIG. 13 could be such that either or both of the filter sections 364 and 368 are not provided.

2.3 State Machine

The description now turns to the state machine 370 of FIG. 3. This state machine 370 has a plurality of states (such as at least four states) corresponding to a plurality of sampling points. It causes transitions of states based on the phase selection signal from the determination section 360, and outputs a sampling point selection signal corresponding to the current state to the data recovery section 400.

Figure 17:
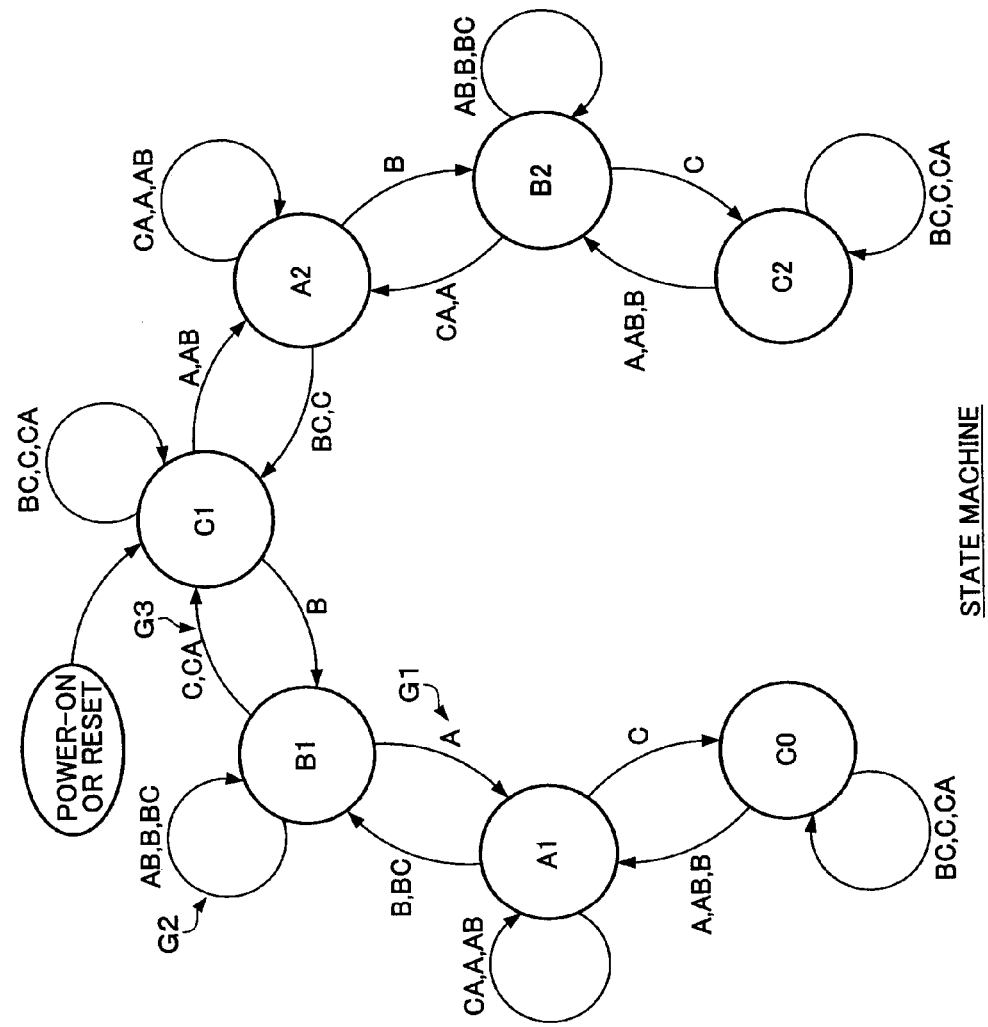
FIG. 17 shows an example of the configuration of the state machine (status transition diagram)

An example of the configuration of the state machine 370 (a status transition diagram) is shown in FIG. 17. There are seven states in FIG. 17, corresponding to seven sampling points C0, A1, B1, C1, A2, B2, and C2. In other words, it is possible to adjust as far as three sampling points on either side of the sampling point C1 at the center (an initial state that occurs after power is applied to the circuit or after a reset).

Figure 18:
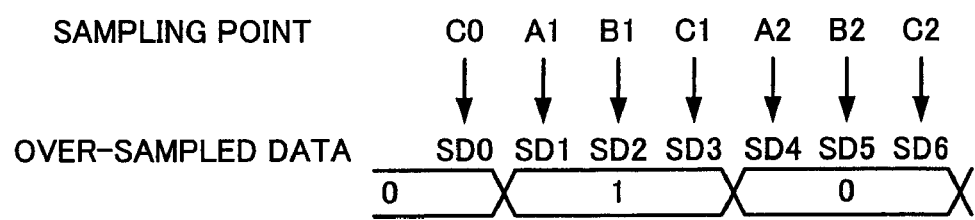
FIG. 18 is illustrative of the operation of the state machine.

The operation of the state machine 370 will now be described with reference to FIGS. 17 and 18.

Assume that the current state in the state machine 370 is sampling point B1, by way of example. If a selection signal that indicates that sampling phase A is appropriate (SELA=1, SELB=0, and SELC=0) is input from the determination section 360 in such a case, the state shifts to that of the adjacent sampling point A1, as shown at G1 in FIG. 17.

If a selection signal that indicates that sampling phase A or B is appropriate (SELA=1, SELB=1, and SELC=0) is input, or if a selection signal that indicates that sampling phase B is appropriate (SELA=0, SELB=1 and SELC=0) is input, or if a selection signal that indicates that sampling phase B or C is appropriate (SELA=0, SELB=1, and SELC=1) is input, the sampling point B1 that is the current state remains, as shown at G2.

If a selection signal that indicates that sampling phase C is appropriate (SELA=0, SELB=0, and SELC=1) is input, the state shifts to that of the adjacent sampling point C1, as shown at G3. Even if a selection signal that indicates that sampling phase C or A is appropriate (SELA=1, SELB=0, and SELC=1) is input, it would be appropriate to shift to a state that selects the sampling point C1, which is adjacent in the direction of the center of the seven sampling points. If the phase selection signal is SELA=0, SELB=0, and SELC=0, in other words, if no suitable sampling phase can be found, the current state remains. In this manner, the state machine 370 determines the state of the current sampling point while referencing the previous state, generates a selection signal specifying the sampling point to be selected, and outputs it to the data recovery section 400.

Figure 19:
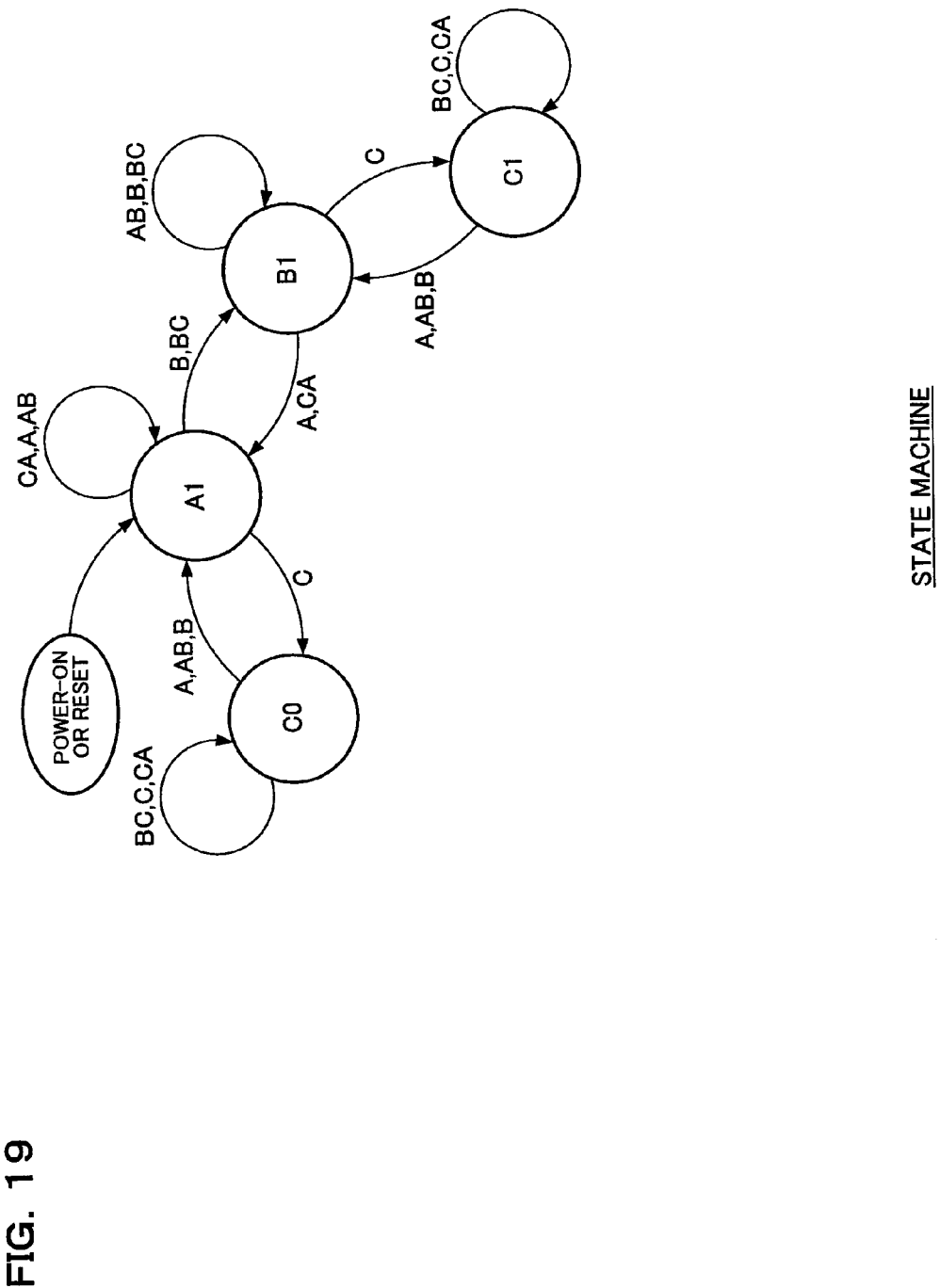
FIG. 19 shows another example of the configuration of the state machine (status transition diagram)

Note that the state machine 370 is not limited to the configuration shown in FIG. 17, and thus it can be modified in various different ways. Another example of the configuration of the state machine 370 is shown in FIG. 19. There are four states in FIG. 19, corresponding to the four sampling points C0, A1, B1, C1. In other words, it is possible to adjust as far as one sampling point in front of and two sampling points behind the sampling point A at the center (an initial state that occurs after power is applied to the circuit or after a reset).

2.4 Data Recovery Section

The description now turns to the data recovery section 400 of FIG. 3. This data recovery section 400 receives the sampling point selection signals (C0, A1, B1, C1, A2, B2, and C2) from the state machine 370 of the sampling point selection section 300 and the oversampled data from the oversampling section 200. The oversampled data at the sampling point specified by these selection signals is output as sample data for the serial data, for data recovery.

Figure 20:
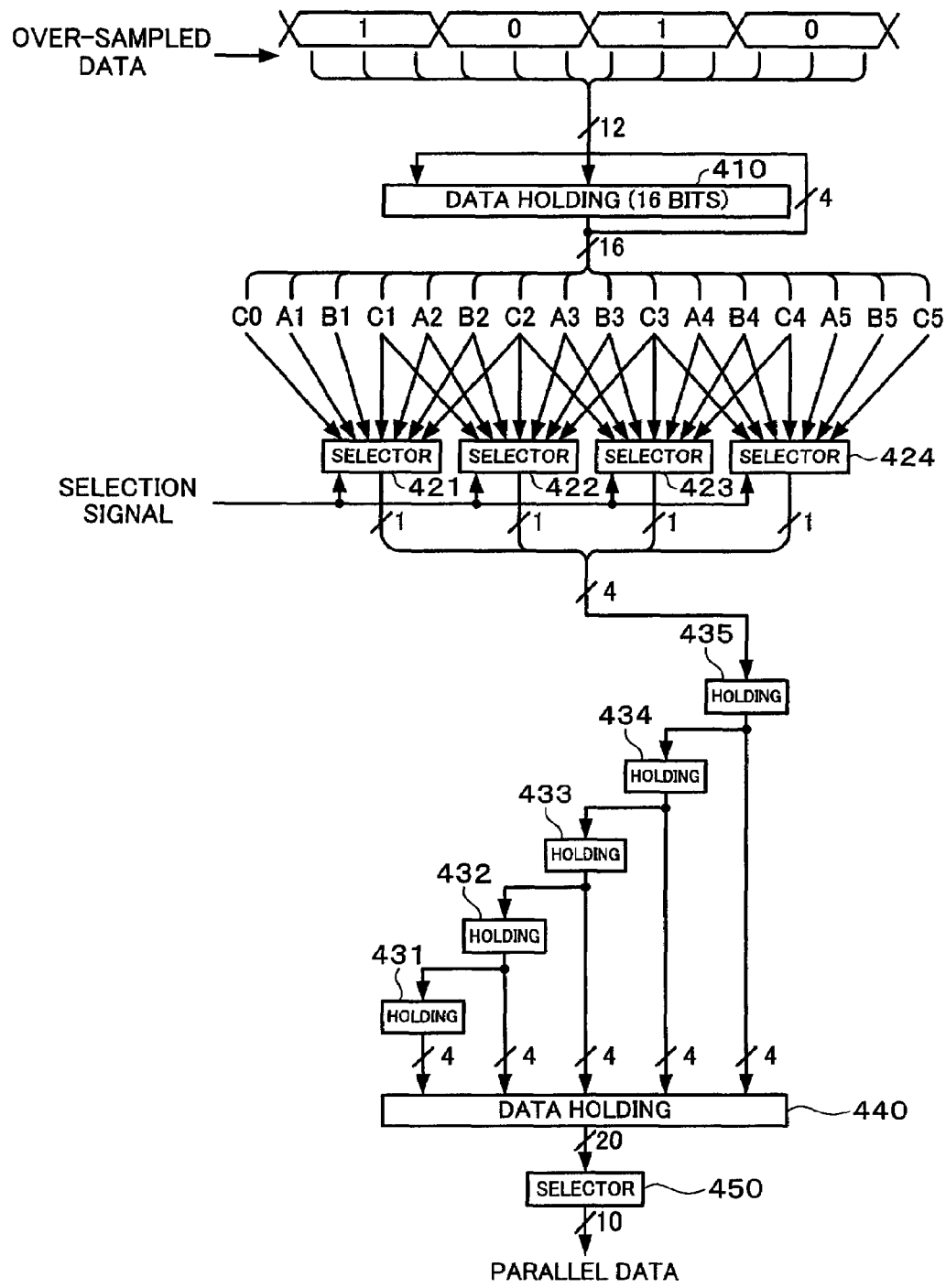
FIG. 20 shows an example of the configuration of the data recovery section.

An example of the configuration of the data recovery section 400 is shown in FIG. 20.

The data recovery section 400 comprises a data holding section 410. This data holding section 410 fetches oversampled data that has been oversampled over a 4-bit segment of the serial data. Since the oversampling is done at three times the rate of the serial data, oversampled data for 12 points is fetched for the 4 bits of serial data. The data holding section 410 holds 16 points of oversampled data (these 12 points plus four points from immediately before), it is configured of a 16-bit flip-flop.

The data recovery section 400 comprises selectors 421, 422, 423, and 424. A predetermined seven oversampled data items from the 16 held in the data holding section 410 are supplied to each of these selectors 421 to 424. Each selector selects one of seven (broadly speaking: a plurality of) oversampled data items in accordance with the selection signal generated by the state machine 370 of the sampling point selection section 300.

If the state (selection signal) of the state machine 370 of FIG. 17 is C1, by way of example, the selector 421 selects the oversampled data corresponding to C1 and outputs it as sample data for the serial data. Similarly, if the state is C0, A1, B1, A2, B2, or C2, by way of example, the selector 421 selects the oversampled data corresponding to C0, A1, B1, A2, B2, or C2 and outputs it as sample data for the serial data. The operation of the selectors 422, 423, and 424 is similar.

Sample data for 4 bits that is output from the selectors 421 to 424 is supplied sequentially to serially-connected holding sections (4-bit flip-flops;) 431 to 435. The holding sections 431 to 435 holds the input sample data for 4 bits to cover five segments, and supplies them in parallel to a data holding section 440 (a 20-bit flip-flop). Thus the 4-bit sample data for five segments (for 20 bits) is accumulated in the data holding section 440. 20-bit sample data that is output from the data holding section 440 is input to the selector 450 and is converted into 10-bit sample data at double the transfer rate. This ensures that 10-bit sample data having a transfer rate equal to that of the frequency of the reference clock is obtained.

2.5 Variant Example

A variation of the transition point detection section (hereinafter called a neighboring-EXOR type of transition point detection section) is shown in FIG. 21. The transition point detection section (hereinafter called a next-but-one EXOR type transition point detection section) of FIG. 4 obtains an exclusive OR of next-but-one oversampled data, whereas that of FIG. 21 obtains an exclusive OR of neighboring oversampled data. In other words, the transition point detection section of FIG. 21 comprises 12 EXOR gates 301 to 312 that obtain exclusive ORs of neighboring pairs of oversampled data. It also comprises the detection signal generation sections 332, 334, and 336 that generate the transition point detection signals DETβ, DETγ, and DETα, based on the outputs of these EXOR gates 301 to 312.

The circuit of the detection signal generation sections 332, 334, and 336 is configured to use either an AND method or an at-least-three method, similar to those shown in FIGS. 10A and 10B.

If detection signal generation sections using the AND method are utilized in a neighboring-EXOR type of transition point detection section, transition points are assumed as shown in FIG. 22A. If detection signal generation sections using the at-least-three method are utilized therefore, on the other hand, transition points are assumed as shown in FIG. 22B.

As is clear from a comparison of FIG. 11A and FIG. 22A relating to the AND method, the next-but-one EXOR type of circuit shown in FIG. 11A makes it possible to utilize the transition point detection information that is obtained in cases 1, 2, and 3 as phase selection information. In contrast thereto, the neighboring-EXOR type of circuit shown in FIG. 22A can only utilize the transition point detection information obtained in case 1. As is clear from a comparison of FIG. 11B and FIG. 22B relating to the at-least-three method, the next-but-one EXOR type of circuit shown in FIG. 11B makes it possible to utilize the transition point detection information that is obtained in cases 1, 2, and 3 as phase selection information. In contrast thereto, the neighboring-EXOR type of circuit shown in FIG. 22B can only utilize the transition point detection information obtained in cases 1 and 2.

Thus the next-but-one EXOR type of circuit is advantageous in that it enables better use of the obtained transition point detection information. If a sampling point is positioned close to a data transition point with the neighboring-EXOR type of circuit, for example, there is a possibility that the phase selection information cannot be obtained. In contrast thereto, the next-but-one EXOR type of circuit makes it possible to obtain phase selection information even when a sampling point is positioned close to a data transition point as in FIG. 6, making it possible to change the sampling phase in such a case.

It should be noted, however, that it is unlikely that a situation could occur in which the data transition points can not be found in actual operation, so this problem does not occur very often even with the neighboring-EXOR type of transition point detection section. This problem with the neighboring-EXOR type of circuit can be solved by increasing the oversampling rate to four or more times.

Figure 23:
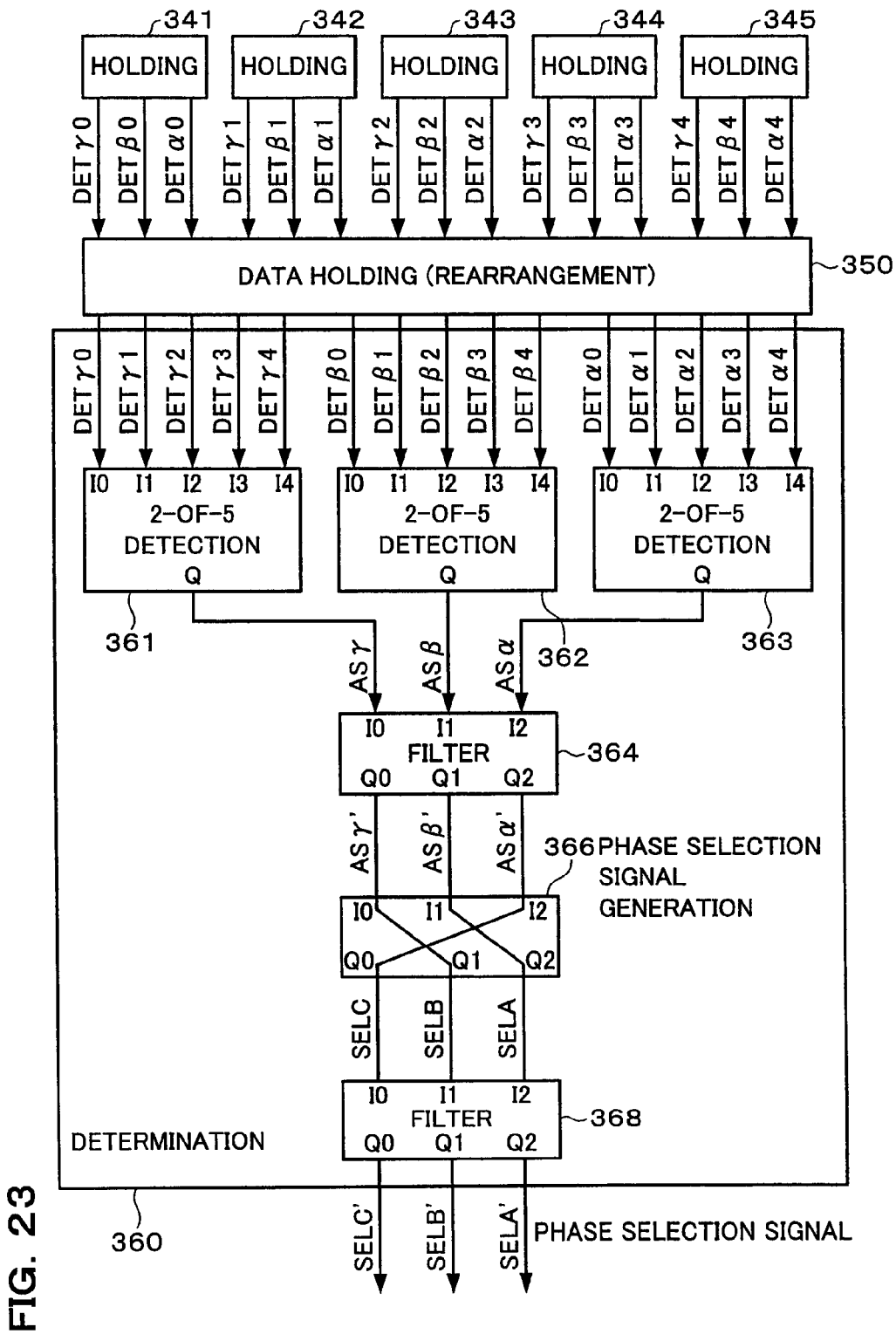
FIG. 23 shows an example of the configuration of the determination section used when the neighboring-EXOR type of transition point detection section is employed.

An example of the configuration of the determination section 360 when the neighboring-EXOR type of transition point detection section is utilized is shown in FIG. 23. Circuit configurations similar to those of FIGS. 14 and 15 are used for the 2-of-5 detection sections 361, 362, and 363, and the filter sections 364 and 368. The phase selection signal generation section 366 could be configured to output the transition point assumption signals AS γ', ASβ', and ASα' as the phase selection signals SELC, SELB, and SELA.

Note that if the neighboring-EXOR type of transition point detection section is utilized, the state machine 370 and the data recovery section 400 could have configurations similar to those in the next-but-one EXOR type of circuit.

2.6 Comparison with Conventional Example

The discussion now turns to differences between the skew adjustment circuit of this embodiment and the skew adjustment circuit of a conventional example disclosed in Japanese Patent Publication No. 11-511926 (U.S. Pat. No. 5,905, 769).

Figure 24A:
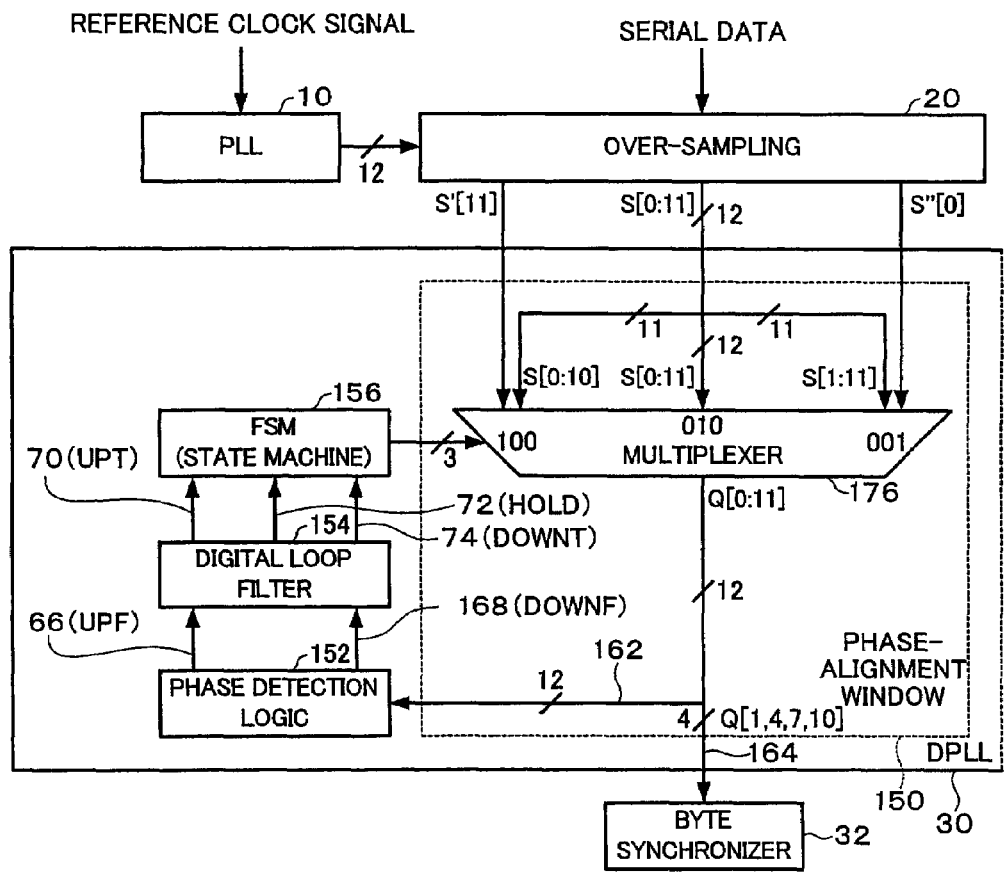
FIGS. 24A and 24B show the configuration of an example of a conventional skew adjustment circuit.
Figure 24B:
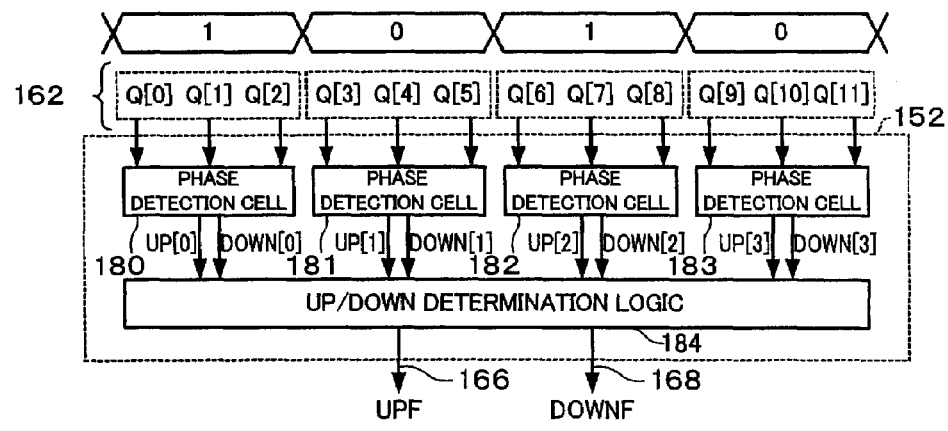

The conventional skew adjustment circuit is shown schematically in FIGS. 24A and 24B.

The oversampled data from the oversampling section 20 is input to a digital phase-lock loop (DPLL) 30. This DPLL 30 comprises a phase-alignment window 150, a phase detection logic circuit 152, a digital loop filter 154, and a phase adjustment finite state machine (FSM) 156. Outputs Q[1,4, 7,10] out of outputs Q[0:11] from a multiplexer 176 comprised by the phase-alignment window 150 are input to a byte synchronizer 32 in a later stage.

As shown in FIG. 24B, the phase detection logic circuit 152 has four phase detection cells 180, 181, 182, and 183. Since the oversampling is performed at three times the rate for the serial data, three oversampled data items are fetched into the phase detection cells for each bit.

If the three oversampled data items in the phase detection cells are "000" or "111", the system determines that there is no skew. If the three oversampled data items are "100" or "011", the system determines that the received data is delayed, and the phase detection logic circuit 152 outputs an up signal 166. If the three oversampled data items are "001" or "110", the system determines that the received data is advanced, and the phase detection logic circuit 152 outputs a down signal 168.

The digital loop filter 154 filters based on the up signal 166 and the down signal 168, to output an up signal 170, a hold signal 172, or a down signal 174 to the FSM 156. The phase-alignment operation of the multiplexer 176 is under the control of the FSM 156.

The discussion now turns to the differences between the conventional skew adjustment circuits of FIGS. 24A and 24B and this embodiment.

(1) The conventional example shown in FIGS. 24A and 24B is a digital phase locked loop (PLL) formed from the multiplexer 176, the phase detection logic circuit 152, the digital loop filter 154, and the FSM 156. In other words, the output of the multiplexer 176 is input to the byte synchronizer 32 and is also returned to the phase detection logic circuit 152.

In contrast thereto, there is no loop like that of the conventional example in this embodiment of FIG. 3. In other words, the output of the data recovery section 400 is input to the byte synchronizer, but it is not returned to the sampling point selection section 300.

(2) The conventional example is configured as a PLL that causes the phase-alignment window 150 to be advanced or delayed by the up signal 170 and the down signal 174. In other words, the phase-alignment window 150 of the conventional example operates in such a manner that the oversampled data Q[1,4,7,10] is always centered between transition points, as shown in FIG. 24B.

In contrast thereto, this embodiment is configured in such a manner that sample data is selected from the oversampled data, based on a selection signal from the sampling point selection section 300. In other words, there is no phase-alignment window like that of the conventional example in this embodiment, so the configuration is not that of a digital PLL.

(3) The conventional example is configured in such a manner that skew adjustment is performed not only during the blanking period but also during the pixel data transfer period. In other words, it does not utilize a circuit configuration for skew adjustment that actively used the blanking period synchronization character, and it does not have a circuit such as the holding sections 341 to 345 of FIG. 3 and the 2-of-5 detection sections 361 to 363 of FIG. 13.

In contrast thereto, this embodiment performs skew adjustment by efficiently using a feature exhibited by 20-bit data configured of a blanking period synchronization character (see FIGS. 8 and 9). In other words, it has the 2-of-5 detection sections 361 to 363 that detect whether or not the transition point detection signals for at least two segments indicate the same result, out of the five segments (20 bits) of the transition point detection signals held in the holding sections 341 to 345 of FIG. 3. This ensures that skew adjustment in accordance with this embodiment is based solely on a synchronization character transferred during the blanking period. It is therefore possible to detect the transition points based on unbiased measurements of the rises and falls of the signal, which enables stable, accurate skew adjustment.

(4) The phase-alignment window 150 of the conventional example can only provide adjustment of three states: "advance the phase", "delay the phase", and "leave the phase unchanged" For that reason, it can happen that the skew between the clock and the data becomes greater than ⅓ bit so that "advance the phase" changes to "delay the phase", or "delay the phase" changes to "advance the phase". That introduces a 1-bit sampling error.

In contrast thereto, this embodiment makes it possible to adjust the state machine to four or more states, as shown in FIGS. 17 and 19. It is therefore possible to ensure that the probability of a sampling error occurring is lower than that in the conventional example.

3. Byte Synchronizer

The description now turns to the byte synchronizer (data synchronization circuit) of this embodiment.

Since there is a some skew between the data channels and the clock channel, a problem can occur in that it is not possible to verify that a 10-bit unit has been received with respect to the phase of the clock signal. In such a case, the byte synchronizer detects the boundaries between characters in the received data and recovers 10-bit data units. The work of detecting the character boundaries cannot be done from the pixel data. However, it is possible to specify the positions of character delimiters by decoding the synchronization character sent during the blanking period of the image signal.

One of the synchronization characters SC00=0010101011, SC01=1101010100, SC10=0010101010. and SC11=1101010101 is transferred in the blanking period, whichever the synchronization character, the initial two bits have the same values but the third to ninth bits alternate in value. It is therefore easy to detect such a synchronization character. The synchronization character can always be detected in the blanking period of the image signal, regardless of its position of the serial data.

Figure 25:
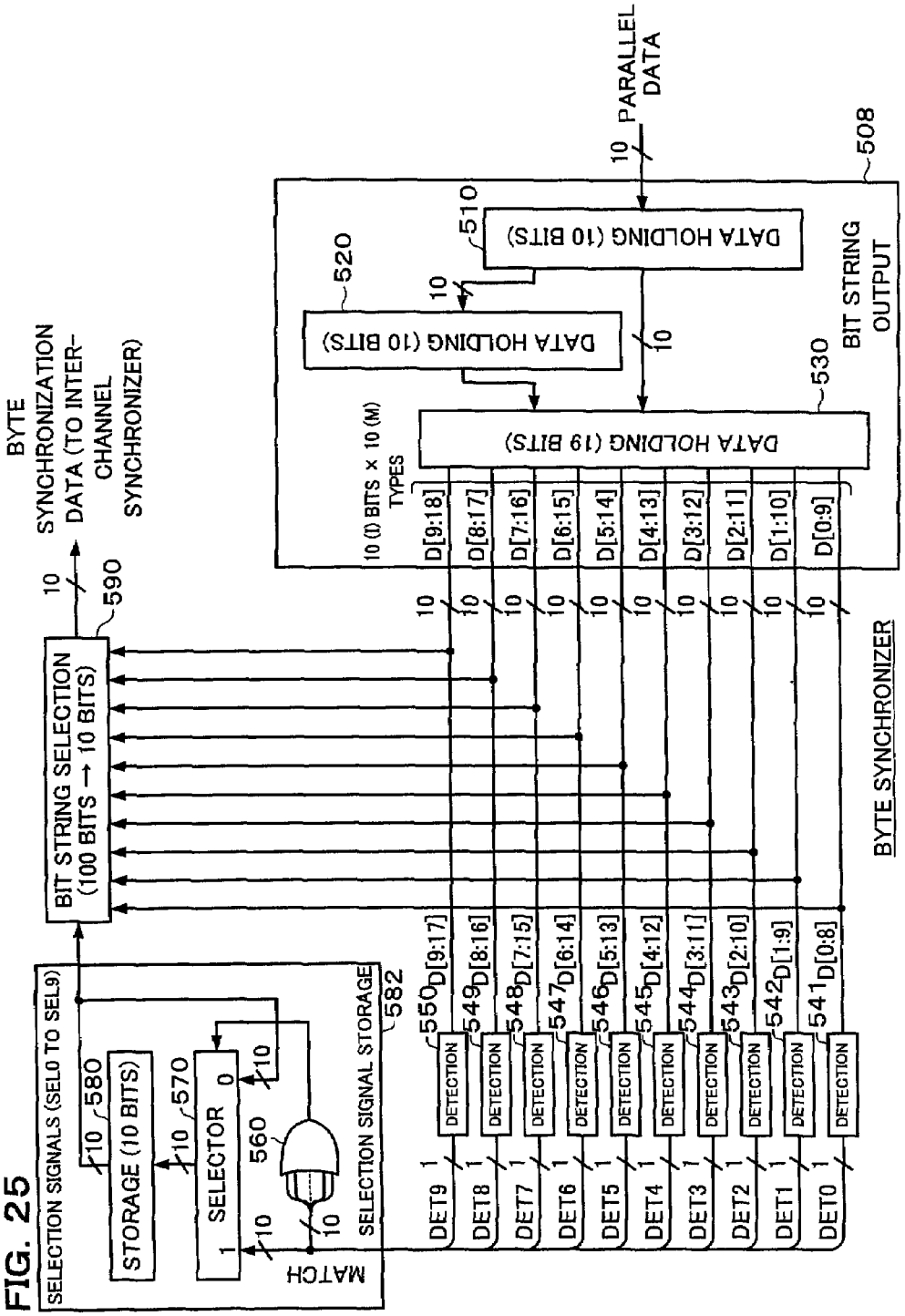
FIG. 25 shows an example of the configuration of the byte synchronizer of this embodiment.

An example of the configuration of the byte synchronizer in accordance with this embodiment is shown in FIG. 25.

A bit string output section 508 holds parallel data obtained from the serial data, then outputs 10-bit (I-bit) bit strings D[0:9], D[1:10]0 . . . D[9:18] (first to Mth bit strings) that are extracted while shifting the thus-held parallel data one bit at a time.

More specifically, the 10-bit parallel data that is output from the skew adjustment circuit of FIG. 3 is supplied to a data holding section 510 (10-bit flip-flop) comprised by the bit string output section 508. The output of the data holding section 510 is also input to a data holding section 520 (10-bit flip-flop), so that two sets of 10-bit parallel data are held in the data holding sections 510 and 520. 19-bit parallel data is fetched from the data holding sections 510 and 520 and supplied to a data holding section 530 (19-bit flip-flop).

The ten different 10-bit bit strings D[0:9] to D[9:18] that are shifted one bit at a time from the data holding section 530 are supplied to detection sections 541 to 550 (synchronization character detection sections) and a bit string selection section 590.

The detection sections 541 to 550 (the first to Mth detection sections) detect whether or not the bit strings D[0:9] to D[9:18] (first to Mth bit strings) match the synchronization character transferred in the blanking period, once or a plurality of times. It outputs detection signals DET0 to DET9 (first to Mth detection signals) that go active in correspondence with a matching bit string.

Figure 26:
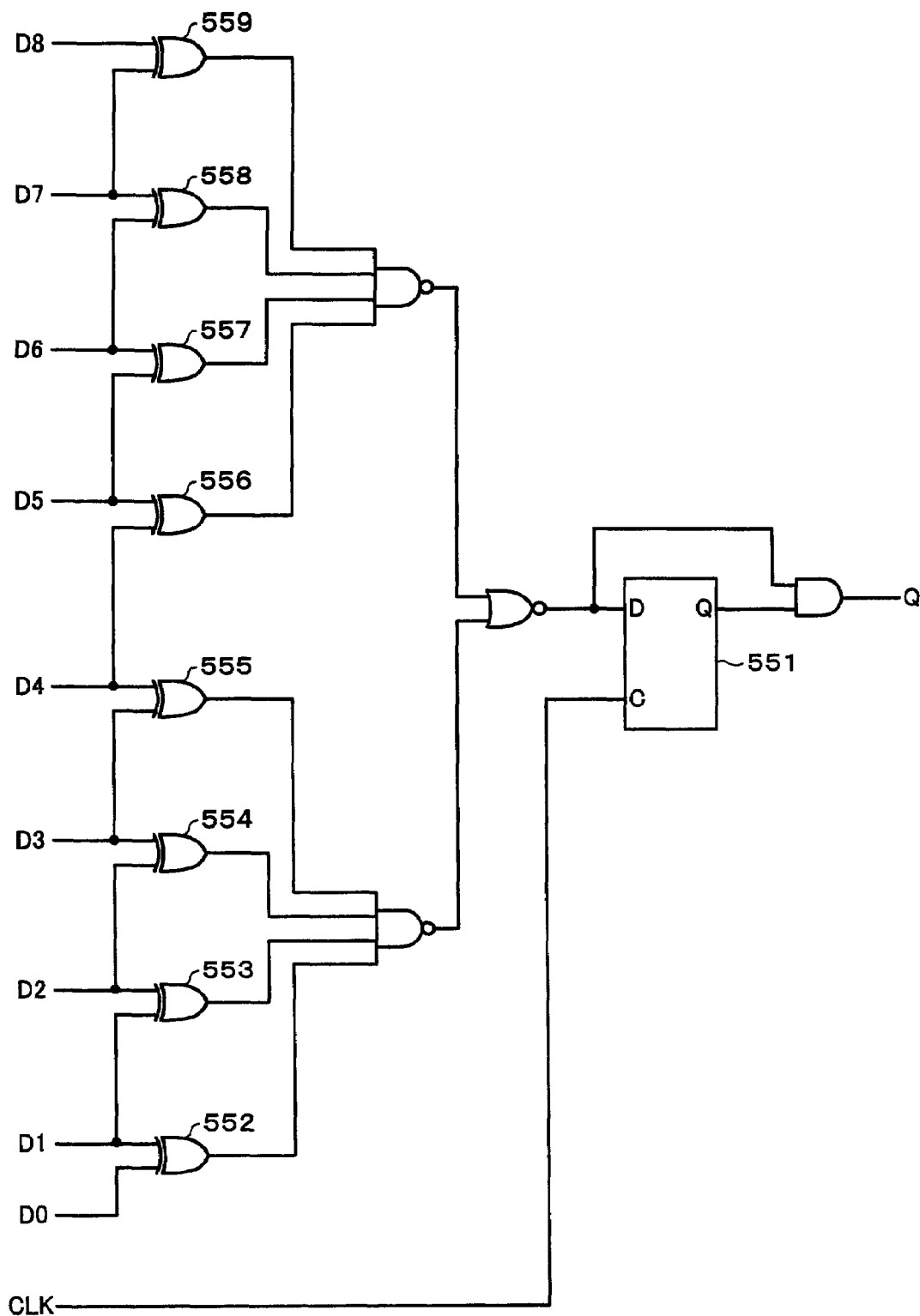
FIG. 26 shows an example of the configuration of the detection section.

An example of the configuration of the detection sections 541 to 550 is shown in FIG. 26. Each detection section uses a delay flip-flop 551 to perform detection in 9-bit units a plurality of times in parallel. In other words, during the first detection (at the first timing), a value of (D0 XNOR D1) AND (D1 EXOR D2) AND (D2 EXOR D3) . . . AND (D7 EXOR D8) is obtained from the 9-bit data D0 to D8 and the 10-bit bit string and the synchronization character are determined to match if this value is 1. The detection sections 541 to 550 output 1 if the input bit string matches the synchronization character twice (broadly speaking: a plurality of times). If the bit string is not detected to match the synchronization character twice (a plurality of times) in succession, on the other hand, they output 0.

The use of the delay flip-flop 551 in this manner enables one set of the exclusive NOR gate 552 and exclusive OR gates 553 to 559 to suffice, making it unnecessary to have two sets thereof, thus reducing the scale of the circuit.

The detection signals DET0 to DET9 from the detection sections 541 to 550 are input to a selection signal storage section 582 in FIG. 25. If any one of the detection signals DET0 to DET9 is 1, the selection signal storage section 582 stores the detection signals DET0 to DET9 as the selection signals SEL0 to SEL9. If none of the detection signals DET0 to DET9 is 1, on the other hand, the previously stored selection signals SEL0 to SEL9 are held without change.

More specifically, the detection signals DET0 to DET9 are supplied to an OR gate 560 and a selector 570. The OR gate 560 obtains an OR of the detection signals DET0 to DET9 and outputs 1 if any one of DET0 to DET9 is 1.

The selector 570 connected to a storage section 580 (10 bit flip-flop) selects and outputs the detection signals DET0 to DET9 from the detection sections 541 to 550 if the output of the OR gate 560 is 1, or selects and outputs selection signals SEL0 to SEL9 stored in the storage section 580 if it is 0. The signal that is output from the selector 570 is stored in the storage section 580

The bit string selection section 590 (selector) receives the bit strings D[0:9] to D[9:18] and the selection signals SEL0 to SEL9, and selects and outputs the bit string that has the selection signal 1 (active), from among the bit strings D[0:9] to D[9:18] It selects D[0:9] if SEL0=1, for example, or D[1:10] if SEL1=1, up to D[9:18] if SEL9=1.

The thus-configured byte synchronizer of this embodiment does not perform a shift operation as a barrel-shifter, instead it fetches one of the bit strings D[0:9] to D[9:18] in accordance with the selection of the bit string selection section 590. The fetched bit string is output to an inter-channel synchronizer in a later stage as byte synchronization data (10-bit data units).

4. Inter-Channel Synchronizer

The description now turns to the inter-channel synchronizer (data synchronization circuit) of this embodiment.

Since there is some skew between the three data channels, it is possible that the byte synchronization data is shifted by up to one byte within the three data channels. The inter-channel synchronizer is designed to enable adjustment of the skew between these data channels.

Even within the inter-channel synchronizer, a synchronization character within the blanking period of the image signal can be used to detect skew, in a similar manner to the byte synchronizer. The data transmitted in each data channel comprises a synchronization character and encoded pixel data. With the DVI standard, a data enable signal (hereinafter abbreviated to "DE signal") goes low (inactive) in a blanking period during which a synchronization character is transferred and goes high (active) in the pixel data transfer period (see FIG. 2). In this case, it is possible to detect skew between the data channels, based on the timing of the rise or fall of the DE signals.

The conventional circuit uses an algorithm such that the DE signal of one data channel is detected when the DE signal of another data channel (assume it is channel 0) has risen, so that if the DE signal in any of the other data channels is low, the a DE signal of channel 0 is delayed.

With this embodiment, on the other hand. DE signals for three channels are input to one holding section (flip-flop) and changes before and after are monitored, so it is possible to use pattern matching to determine which channel has data delay.

The description now turns to the pattern matching performed in the inter-channel synchronizer of this embodiment, with reference to FIG. 27.

The data enable signal (DE signal), which is used to distinguish whether the data in each channel is pixel data or a synchronization character, goes to 0 if a synchronization character is detected or 1 if no synchronization character is detected. Assume that the DE signals for the three data channels are DE0, DE1, and DE2. In addition, the signals that are input at the first timing (first reference clock period) are denoted by DE$0(t_0)$ to DE$2(t_0)$ and those that are input at the subsequent second timing (second reference clock period) are denoted by DE$0(t_1)$ to DE$2(t_1)$.

A status in which any one of DE$0(t_0)$ to DE$2(t_0)$ is 0 and also all of DE$0(t_1)$ to DE$2(t_1)$ are 1, as shown in FIG. 27, corresponds to the timing of the rise of the DE signal in the channel that is the most delayed.

In case A, all of DE$0(t_0)$ to DS$2(t_0)$ are 0 so it is clear that the timings of the DE signals of the three channels are aligned. In such a case, 0 is output as each of selection signals S0, S1, and S2. This causes the selection of the most delayed data channel.

In case B, DE$0(t_0)$ is 1 while DE$1(t_0)$ and DE$2(t_0)$ are 0, so it is clear that the timing of data in channel 0 is delayed. In such a case, the selection signal SO is output as land the selection signals S1 and S2 are output as 0. This causes the selection of data in channel 0 as the most delayed, with the data in channels 1 and 2 selected as not being delayed. Similarly, the data in channel 1 is delayed in case C and the data in channel 2 is delayed in case D.

In case E. DE$0(t_0)$ is 0 while DE$1(t_0)$ and DE$2(t_0)$ are 1, so it is clear that the timing of channels 1 and 2 is advanced. In such a case, the selection signal S0 is output as 0 and the selection signals S1 and S2 are output as 1. This causes the selection of data in channel 0 as the most delayed, with the data in channels 1 and 2 selected as not being delayed. Similarly, the data in channels 0 and 2 is delayed in case F and the data in channels 0 and 1 is delayed in case G.

Figure 28:
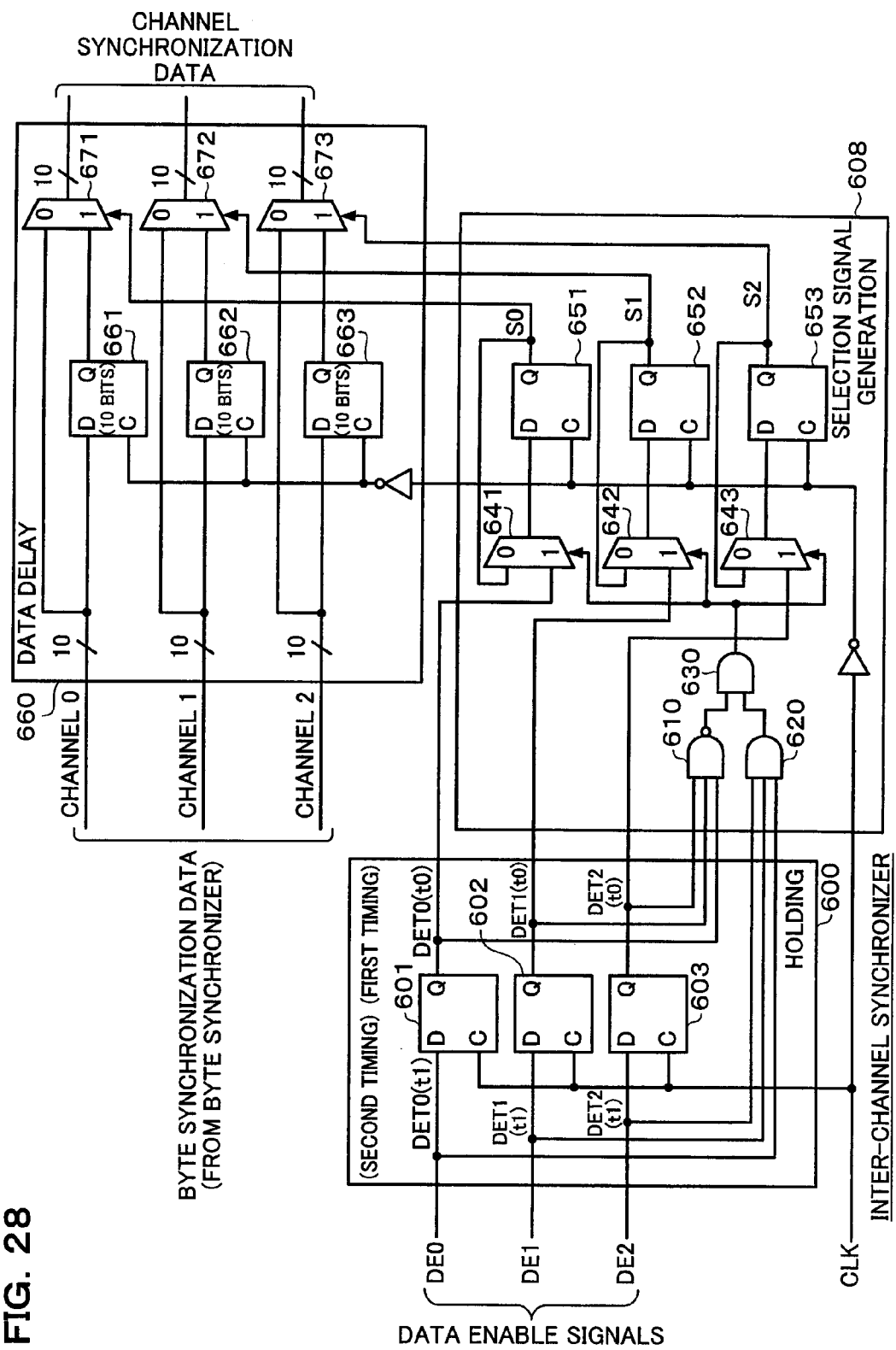
FIG. 28 shows an example of the configuration of the inter-channel synchronizer of this embodiment.
Figure 29:
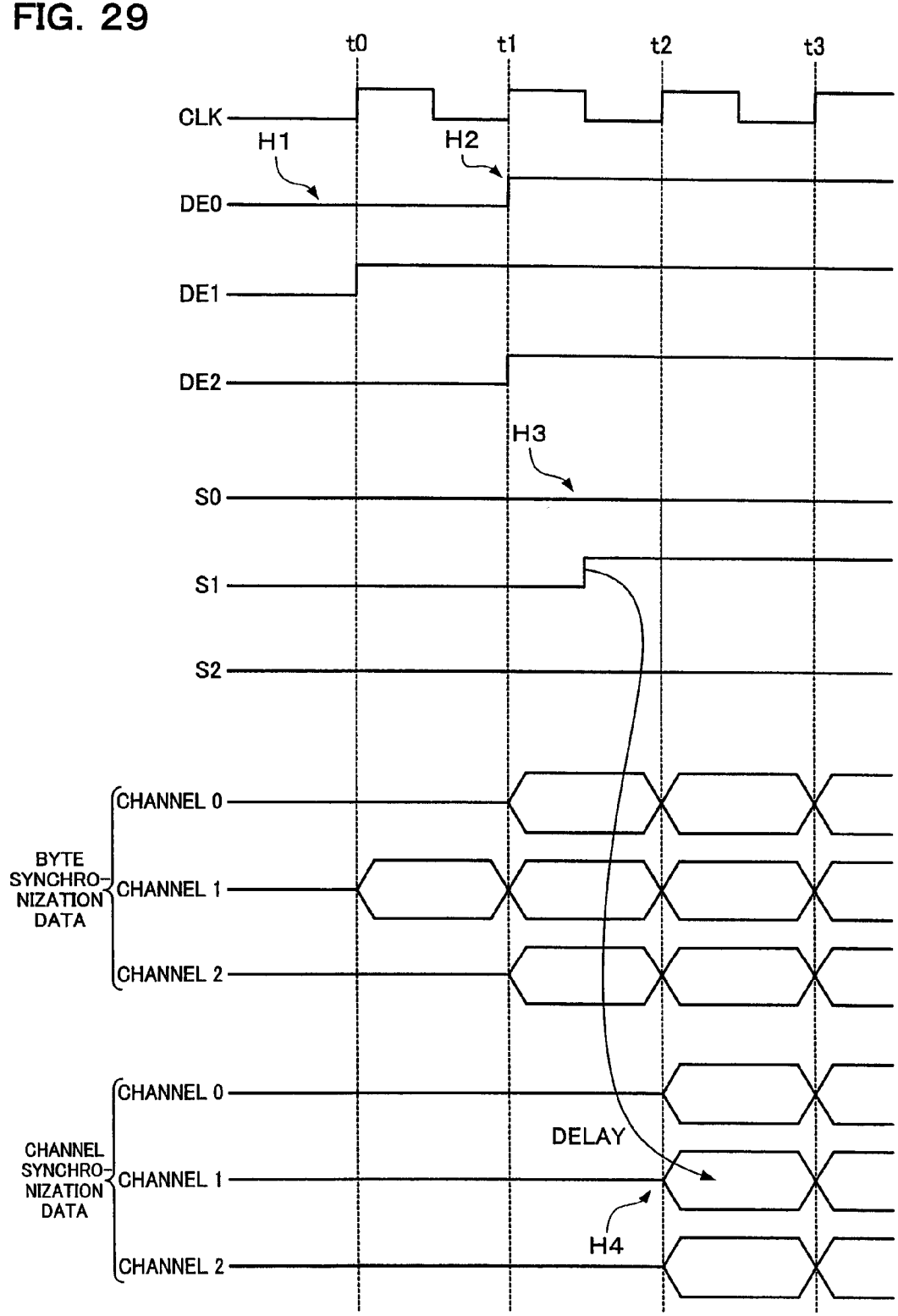
FIG. 29 is a timing waveform chart illustrative of the operation of the inter-channel synchronizer.

An example of the configuration of the inter-channel synchronizer in accordance with this embodiment is shown in FIG. 28 and a timing waveform chart thereof is shown in FIG. 29.

In FIG. 28, a holding section 600 (flip-flops 601, 602, and 603) sequentially holds the DE signal (first to Lth data enable signals) for the data channels, based on the clock CLK.

If any one of the signals DE$0(t_0)$ to DE$2(t_0)$ held at the first timing $(t_0)$ is 0 (inactive), as shown at H1 in FIG. 29, and also if all of the signals DE$0(t_1)$ to DE$2(t_1)$ held at the second timing $(t_1)$ are 1 (active), as shown at H2, a selection signal generation section 608 outputs DE$0(t_0)$ to DE$2(t_0)$ as the selection signals S0 to S2 (first to Lth selection signals), as shown at H3.

More specifically, the signals DE$0(t_0)$ to DE$2(t_0)$ that were input at the first timing $(t_0)$ are present in the output of the holding section 600 and the signals DE$0(t_1)$ to DE$2(t_1)$ that were input at the second timing $(t_1)$ are present in the input of the holding section 600.

In this case, an inverted AND gate of DE$0(t_0)$ to DE$2(t_0)$ is obtained by a 3-input NAND gate 610 and an AND of DE$0(t_1)$ to DE$2(t_1)$ is obtained by a 3-input AND gate 620. An AND is obtained by an AND gate 630 of the output of the NAND gate 610 and the output of the AND gate 620.

If the output of the AND gate 630 is 1, selectors 641 to 643 select DE$0(t_0)$ to DE$2(t_0)$ and the selected DE$0(t_0)$ to DE$2(t_0)$ are held by flip-flops 651 to 653. This generates the selection signals S0 to S2 shown at H3 in FIG. 29.

A data delay section 660 delays the data in each of channels 0 to 2 (first to Lth channels) for which the selection signals S0 to S2 (first to Lth selection signals) is 1.

More specifically, the byte synchronization data for three channels that is output from the byte synchronizer of FIG. 25 is supplied as first inputs to the flip-flops 661 to 663 and selectors 671 to 673 comprised by the data delay section 660. Delay data that is output from the flip-flops 661 to 663 is supplied to the second inputs of the corresponding selectors 671 to 673. The selectors 671 to 673 each select either non-delayed data or delayed data, depending on the selection signals S0 to S2. This makes it possible to obtain channel synchronization data wherein inter-channel skew has been adjusted, as shown at H4 in FIG. 29.

With this embodiment, the selection signal generation section 608 that generates the selection signals S0 to S3 is not provided for each channel; only one section is provided for all three channels. This enables a reduction in size of the circuit.

Note that although this embodiment was described as relating to the detection of the timing of the rise of the DE signal, it could equally well detect the timing of the fall of the DE signal.

Note also that the present invention is not limited to this embodiment: various different modifications thereof are possible within the scope of the invention laid out herein.

For example, terminology (such as: 4-bit segment, first to fifth 4-bit segments, first to fifth transition point detection signals, and flip-flops) that is derived from generic terminology defined within this document (such as; J-bit segments, first to Nth J-bit segments, first to first to transition point detection signals, and data holding sections) could be replaced by other terminology used within this document.

The skew adjustment circuit and data synchronization circuit in accordance with the present invention are not limited to the configurations shown in FIGS. 3, 25, and 28, and thus various different modifications thereof are possible. For example, some of the structural elements of FIGS. 3, 25, and 28 could be omitted, or the connective relationship between them could be varied. Alternatively, details such as the bit width of the data could be changed.

Although this embodiment has been described with reference to an application to a skew adjustment method and data synchronization method of the DVI standard, the present invention is not limited thereto. For example, the present invention can also be applied to a skew adjustment method and data synchronization method of a standard that is similar in concept to the DVI standard, or to a standard developed from DVI.

What is claimed is:

1. A skew adjustment circuit, comprising:
    a sampling point selection section which receives oversampled data obtained by oversampling serial data, performs comparison processing on the oversampled data, assumes a transition point of the serial data based on a result of the comparison, and outputs a selection signal for selecting a sampling point of serial data from among oversampling points; and a data recovery section which receives the oversampled data and the selection signal, and outputs oversampled data at a sampling point selected by the selection signal, as sample data of the serial data, skew adjustment being performed on a condition that at least two all-bits transition patterns of serial data segments are detected within the serial data of a predetermined number of bits that is transferred in a blanking period, wherein the sampling point selection section:
  performs comparison processing on a predetermined number of groups of the oversampled data, where each of the groups including a pair of non-contiguous points of the oversampled data;
  assumes a transition point of serial data based on a result of the comparison processing; and
  includes a predetermined number of exclusive OR gates that each obtain an exclusive OR of a pair of non-contiguous points of the oversampled data, where each of the pair of non-contiguous points are separated by a predetermined interval of at least one point of the oversampled data between the non-contiguous points.

2. A skew adjustment circuit, comprising:

a sampling point selection section which receives oversampled data obtained by oversampling serial data, performs comparison processing on the oversampled data, assumes a transition point of the serial data based on a result of the comparison, and outputs a selection signal for selecting a sampling point of serial data from among oversampling points; and a data recovery section which receives the oversampled data and the selection signal, and outputs the oversampled data at a sampling point selected by the selection signal, as sample data of the serial data, wherein the sampling point selection section:
  performs comparison processing on a predetermined number of groups of the oversampled data, each of the groups including a pair of non-contiguous points of the oversampled data;
  assumes a transition point of serial data based on a result of the comparison processing; and
  includes a predetermined number of exclusive OR gates that each obtain an exclusive OR of a pair of non-contiguous points of the oversampled data, where each of the pair of non-contiguous points are separated by a predetermined interval of at least one point of the oversampled data between the non-contiguous points.

3. A skew adjustment method of performing comparison processing on oversampled data obtained by oversampling serial data, assuming a transition point of the serial data based on a result of the comparison, selecting a sampling point of the serial data from among oversampling points, and outputting oversampled data at the selected sampling point, as sample data of the serial data, the method comprising:

performing skew adjustment on a condition that at least two all-bits transition patterns of serial data segments are detected within the serial data of a predetermined number of bits that are transferred in a blanking period, wherein the comparison processing is performed by a predetermined number of exclusive OR gates that each obtain an exclusive OR of a pair of non-contiguous points of the oversampled data, where each of the pair of non-contiguous points are separated by a predetermined interval of at least one point of the oversampled data between the non-contiguous points.

4. A skew adjustment method of performing comparison processing on oversampled data obtained by oversampling serial data, assuming a transition point of the serial data based on a result of the comparison, selecting a sampling point of the serial data from among oversampling points, and outputting the oversampled data at the selected sampling point, as sample data of the serial data, the method comprising:

performing comparison processing on a predetermined number of groups of the oversampled data, each of the groups including a pair of alternating points of the oversampled data; and assuming a transition point of the serial data based on a result of the comparison, where each of the pair of alternating points are separated by at least one point of the oversampled data between the alternating points, wherein the comparison processing is performed by a predetermined number of exclusive OR gates that each obtain an exclusive OR of a pair of non-contiguous points of the oversampled data, where each of the pair of non-contiguous points are separated by a predetermined interval of at least one point of the oversampled data between the non-contiguous points.

* * * * *